United States Patent
Liu et al.

(10) Patent No.: US 11,748,037 B2
(45) Date of Patent: *Sep. 5, 2023

(54) PHYSICAL DISK AND VIRTUAL DISK MAPPING IN STORAGE SYSTEMS

(71) Applicant: Huawei Technologies Co., Ltd., Shenzhen (CN)

(72) Inventors: Huawei Liu, Shenzhen (CN); Yu Hu, Shenzhen (CN); Can Chen, Chengdu (CN); Jinshui Liu, Shenzhen (CN); Xiaochu Li, Dongguan (CN); Chunyi Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,201

(22) Filed: Jul. 25, 2022

(65) Prior Publication Data
US 2022/0357894 A1 Nov. 10, 2022

Related U.S. Application Data

(63) Continuation of application No. 16/785,008, filed on Feb. 7, 2020, now Pat. No. 11,416,172, which is a
(Continued)

(51) Int. Cl.
*G06F 3/06* (2006.01)

(52) U.S. Cl.
CPC .......... *G06F 3/0659* (2013.01); *G06F 3/064* (2013.01); *G06F 3/067* (2013.01); *G06F 3/0611* (2013.01);
(Continued)

(58) Field of Classification Search
CPC ...... G06F 3/0604; G06F 3/061; G06F 3/0611; G06F 3/0617; G06F 3/0629;
(Continued)

(56) References Cited

U.S. PATENT DOCUMENTS

| 7,389,393 B1 | 6/2008 | Karr et al. |
| 8,473,690 B1 | 6/2013 | Condict |

(Continued)

FOREIGN PATENT DOCUMENTS

| CN | 102460439 A | 5/2012 |
| CN | 102622189 A | 8/2012 |

(Continued)

OTHER PUBLICATIONS

"NVM Express over Fabrics," Revision 1.0, Jun. 5, 2016, 49 pages.
"NVM Express," Revision 1.3, May 1, 2017, 282 pages.

*Primary Examiner* — Larry T MacKall
(74) *Attorney, Agent, or Firm* — Conley Rose, P.C.

(57) ABSTRACT

A first storage node communicates with at least one second storage node. A physical disk included in the at least one second storage node is mapped as a virtual disk of the first storage node. The method may include: receiving a first write request, where the first write request carries first to-be-written data; striping the first to-be-written data to obtain striped data, and writing the striped data to a physical disk and/or the virtual disk of the first storage node; and recording a write location of the striped data. For example, the technical solution may be applied to a storage system that includes an NVMe SSD.

22 Claims, 17 Drawing Sheets

Related U.S. Application Data continuation of application No. PCT/CN2017/096958, filed on Aug. 10, 2017.

(52) U.S. Cl.
CPC .......... *G06F 3/0617* (2013.01); *G06F 3/0653* (2013.01); *G06F 3/0665* (2013.01); *G06F 3/0689* (2013.01)

(58) Field of Classification Search
CPC ...... G06F 3/0635; G06F 3/064; G06F 3/0653; G06F 3/0658; G06F 3/0659; G06F 3/0665; G06F 3/067; G06F 3/0679; G06F 3/0689; G06F 11/2221; G06F 12/1009
See application file for complete search history.

(56) References Cited

U.S. PATENT DOCUMENTS

| | | |
|---|---|---|
| 2007/0239944 A1 | 10/2007 | Rupanagunta et al. |
| 2010/0262762 A1 | 10/2010 | Borchers et al. |
| 2010/0281214 A1 | 11/2010 | Jernigan, IV |
| 2013/0007008 A1 | 1/2013 | Yuan et al. |
| 2013/0042052 A1 | 2/2013 | Colgrove et al. |
| 2014/0195634 A1 | 7/2014 | Kishore et al. |
| 2015/0012607 A1 | 1/2015 | Cayton et al. |
| 2015/0058863 A1* | 2/2015 | Karamanolis ......... G06F 9/5016 718/105 |
| 2015/0095554 A1 | 4/2015 | Asnaashari et al. |
| 2015/0248366 A1 | 9/2015 | Bergsten et al. |
| 2015/0324123 A1 | 11/2015 | Storer et al. |
| 2016/0004603 A1 | 1/2016 | Lakshman |
| 2016/0127492 A1 | 5/2016 | Malwankar et al. |
| 2017/0177223 A1 | 6/2017 | Zhang et al. |
| 2018/0024775 A1 | 1/2018 | Miller |
| 2018/0357140 A1* | 12/2018 | Xiang ................. G06F 11/1088 |

FOREIGN PATENT DOCUMENTS

| | | |
|---|---|---|
| CN | 102915278 A | 2/2013 |
| CN | 103092786 A | 5/2013 |
| CN | 103942292 A | 7/2014 |
| CN | 104020961 A | 9/2014 |
| CN | 105095290 A | 11/2015 |
| CN | 105487818 A | 4/2016 |
| CN | 2016539399 A | 12/2016 |
| EP | 3037950 A | 6/2016 |
| JP | 2008123198 A | 5/2008 |
| KR | 20160046816 A | 4/2016 |

* cited by examiner

PHYSICAL DISK AND VIRTUAL DISK MAPPING IN STORAGE SYSTEMS

CROSS-REFERENCE TO RELATED APPLICATIONS

This is a continuation of U.S. Pat. App. Ser. No. 16/785,008 filed on Feb. 7, 2020, which is a continuation of Int'l Patent App. No. PCT/CN2017/096958 filed on Aug. 10, 2017, both of which are incorporated by reference.

TECHNICAL FIELD

This disclosure relates to the field of storage technologies, and in particular, to a data access method, an apparatus, and a system.

BACKGROUND

FIG. 1 is a schematic diagram of an architecture of a storage system according to some approaches. The storage system is connected to a host by using two switches. The storage system further includes a plurality of dual-controller arrays that are connected to each switch. Each dual-controller array includes two storage controllers, and a plurality of hard disk drives (HDDs) that are connected to each storage controller. The two storage controllers are connected by using a redundant mirror channel, to implement a mirror operation in a data write procedure. In the system, each dual-controller array is used as a dual-controller array unit, and each dual-controller array unit corresponds to some logical block addresses (LBA) of the host. A read/write request that is sent by the host is forwarded by the switch to a dual-controller array unit that corresponds to an LBA carried in the read/write request. Then, the dual-controller array unit locally implements a data read/write operation in the dual-controller array unit.

The system architecture shown in FIG. 1 is provided based on an HDD. With gradual popularity of NVM Express (NVMe) solid-state drives (SSD), an NVMe SSD is usually applied to a dual-controller array. However, compared with that of an HDD, performance of an NVMe SSD has been enhanced by hundreds of and even thousands of times. For example, read-only input/output operations per second (IOPS) of a P3600 NVMe SSD of Intel reaches 0.45 million, and write-only IOPS also reaches 0.07 million. IOPS is an English acronym of input/output operations per second. In the system architecture shown in FIG. 1, all processing operations are performed by the two storage controllers, but processing capabilities of the storage controllers are limited. Therefore, the dual-controller array storage architecture shown in FIG. 1 is no longer applicable to a storage system that uses an NVMe SSD as a storage medium, and a system architecture of a new type is urgently needed.

SUMMARY

Embodiments provide a data access method, an apparatus, and a system, which are applicable to a storage system that uses an NVMe SSD as a storage medium.

To achieve the foregoing objective, the following technical solutions are used in the embodiments.

According to a first aspect, a data access method is provided, applied to a first storage node in a storage system, where the first storage node communicates with at least one second storage node in the storage system by using a switch and a host, and a physical disk included in the at least one second storage node is mapped to a virtual disk of the first storage node. The method may include: receiving a first write request, where the first write request carries first to-be-written data; then, striping the first to-be-written data to obtain striped data, and writing the striped data to a physical disk and/or the virtual disk of the first storage node; and recording a write location of the striped data. The first storage node may be any storage node in the storage system. The first write request received by the first storage node may be a first write request sent by the host, or may be a first write request that is forwarded by any second storage node and that is from the host. In this technical solution, some or all of physical disks (for example, memory chips) included in each storage node may be mapped to another storage node, to be used as virtual disks of the another storage node. For example, the some or all of the physical disks may be mapped by using, but is not limited to, an NOF protocol. Therefore, compared with some approaches, this technical solution may not be limited by a processing capability of a CPU or a storage controller in a dual-controller array, so that a processing capability of the storage system may be greatly improved.

In a possible design, when the striped data is written to the virtual disk, the striped data is written to the physical disk that is in the second storage node and that is mapped to the virtual disk. For example, the first storage node sends corresponding striped data to a corresponding second storage node, and then the second storage node stores the received data in a local disk (that is, the physical disk mapped to the virtual disk).

In a possible design, when the write location of the striped data is recorded, a fingerprint of the first to-be-written data is further recorded. For example, the write location of the striped data and the fingerprint of the first to-be-written data are recorded in, but are not limited to, distribution information of the first to-be-written data. For specific implementations, refer to the following specific implementations.

In a possible design, when the write location of the striped data is recorded, an LBA of the first to-be-written data is further recorded, where the LBA is an LBA carried in the write request. For example, the write location of the striped data and the LBA of the first to-be-written data are recorded in, but are not limited to, distribution information of the first to-be-written data.

The foregoing technical solutions are provided by using the first storage node as the storage node that performs a write operation. In some other embodiments, the first storage node may further perform other steps:

In a possible design, the first storage node may receive a second write request sent by the host, where the second write request carries second to-be-written data; and then, determine a home node of the second write request based on the second write request, and if the home node of the second write request is the first storage node, the first storage node performs a write operation in response to the second write request, or if the home node of the second write request is the second storage node, the first storage node forwards the second write request to the second storage node, so that the second storage node performs a write operation in response to the second write request. For an implementation of performing the write operation, refer to the technical solutions provided above or specific implementations provided below, and details are not described herein again.

In a possible design, the determining a home node of the second write request based on the second write request may include: calculating a fingerprint of the second to-be-written data; and then, determining the home node of the second write request based on the fingerprint of the second to-be-written data. In this possible design, the home node of the second write request is specifically a home node of the second to-be-written data. Based on this, optionally, the method may further include: determining a home node of an LBA carried in the second write request, where the home node of the LBA is configured to manage a mapping relationship between the LBA and the fingerprint of the second to-be-written data.

In a possible design, the determining a home node of the second write request based on the second write request may include: determining the home node of the second write request based on an LBA carried in the second write request. In this possible design, the home node of the second write request is specifically a home node of the LBA carried in second write request.

The steps performed by the first storage node in a data write procedure are used as an example above for description, and the following describes steps performed by the first storage node in a data read procedure.

In a possible design, the first storage node receives a fingerprint of first to-be-read data requested by a first read request; and then, obtains a write location of the first to-be-read data based on the fingerprint of the first to-be-read data, and reads striped data of the first to-be-read data from the write location of the first to-be-read data. The first storage node stores a mapping relationship between the write location of the first to-be-read data and the fingerprint of the first to-be-read data.

In a possible design, the first storage node receives a first read request, where the first read request carries a first LBA; and then, obtains, based on the first LBA, a write location of first to-be-read data requested by the first read request, and reads striped data of the first to-be-read data from the write location of the first to-be-read data. The first storage node stores a mapping relationship between the write location of the first to-be-written data and the first LBA.

The technical solutions provided above in the data read procedure are described by using an example in which the first storage node is used as the storage node that performs a read operation. In some other embodiments, the first storage node may further perform other steps:

In a possible design, the first storage node receives a second read request sent by the host; and then, determines a home node of the second read request based on the second read request, and if the home node of the second read request is the first storage node, the first storage node performs a read operation in response to the second read request, or if the home node of the second read request is the second storage node, the first storage node forwards the second read request to the second storage node, so that the second storage node performs a read operation in response to the second read request. For an implementation of performing the read operation, refer to the technical solutions provided above or specific implementations provided below, and details are not described herein again.

In a possible design, the determining a home node of the second read request based on the second read request may include: determining a home node of an LBA carried in the second read request, where the home node of the LBA is configured to manage a mapping relationship between the LBA and a fingerprint of second to-be-read data requested by the second read request; then, obtaining the fingerprint of the second to-be-read data from the home node of the second LBA; and determining the home node of the second read request based on the fingerprint of the second to-be-read data. Alternatively, a home node of an LBA carried in the second read request is determined, and then, a fingerprint of second to-be-read data and the home node of the second read request are obtained from the home node of the second LBA. In this possible design, the home node of the second read request is specifically a home node of the second to-be-read data.

In a possible design, the determining a home node of the second read request based on the second read request may include: determining the home node of the second read request based on an LBA carried in the second read request. In this possible design, the home node of the second read request is specifically a home node of the LBA carried in the second read request.

According to a second aspect, a storage node is provided, where the storage node may perform function module division on the storage node according to the foregoing method examples, for example, may divide function modules corresponding to functions, or may integrate two or more functions into one processing module.

According to a third aspect, a storage node is provided, including a storage and a processor, where the storage is configured to store a computer program, and when the computer program is executed by the processor, the method according to the first aspect or any possible design of the first aspect is performed. The storage may be a memory and/or a memory chip, and/or the like. The processor may be a CPU and/or a control storage, and/or the like.

According to a fourth aspect, a data access system is provided, including the storage node according to either the second aspect or the third aspect, where the storage node communicates with at least one second storage node in a storage system by using a switch and a host, and a physical disk included in the at least one second storage node is mapped to a virtual disk of the storage node.

A computer-readable storage medium stores a computer program, where when the program runs on a computer, the computer performs the method according to the first aspect or any possible design of the first aspect.

A computer program product, where when the computer program product runs on a computer, the computer performs the method according to any one of the foregoing aspects.

A communications chip stores an instruction, where when the communications chip runs on a storage node, the storage node performs the method according to the first aspect or any possible design of the first aspect.

It may be understood that, any apparatus or computer storage medium or computer program product provided above is used for performing the corresponding methods provided above. Therefore, for beneficial effects that can be achieved by the apparatus or computer storage medium or computer program product, refer to beneficial effects of the corresponding methods, and details are not described herein again.

DESCRIPTION OF EMBODIMENTS

The term "a plurality of" in this specification means two or more than two. The terms "first", "second", and the like in this specification are used for only distinguishing different objects, and do not limit a sequence thereof. For example, a first storage node and a second storage node are used for distinguishing different objects, and do not limit a sequence thereof. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 2:
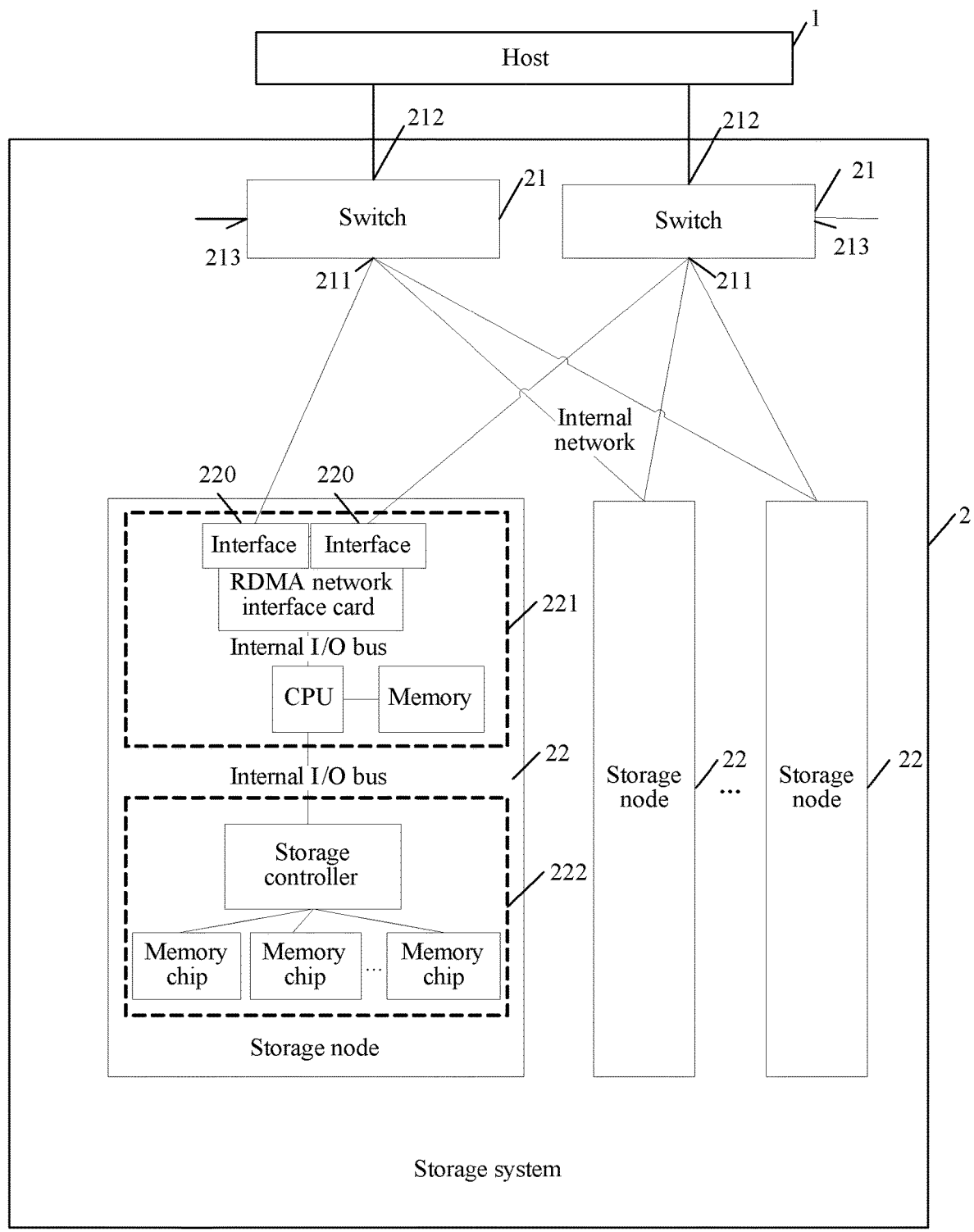
FIG. 2 is a schematic diagram of a system architecture.

FIG. 2 is a schematic diagram of a system architecture. The system architecture shown in FIG. 2 may include a host 1 and a storage system 2. The storage system 2 may include: a switch 21 and a plurality of storage nodes 22 separately connected to the switch 21. It may be understood that, to improve reliability, the storage system 2 may be usually provided with at least two switches 21. In this case, each storage node 22 is connected to all of the switches 21. That the storage system 2 includes two switches 21 is used as an example in FIG. 2 for description.

The switch 21 is configured to communicate with the storage nodes 22, and connect the storage nodes 22 and the host 1. For example, the switch 21 may be, but is not limited to, an Ethernet switch, an InfiniBand switch, a PCIe switch, or the like.

For example, when being divided according to functions, the switch 21 may include an internal exchange port 211 and a storage service port 212. Optionally, the switch 21 may further include an extended port 213. The internal exchange port 211 is a port connected to the storage nodes 22. Each switch 21 may be provided with one or more internal exchange ports 211, and each internal exchange port 211 may be connected to one internal port 220 of one storage node 22. The storage service port 212 is a port connected to the host 1, and is configured to provide a storage service for an external device. Each switch 21 may be provided with one or more storage service ports 212. The extended port 213 is configured to connect to another switch 21, to implement scaling out of a plurality of storage systems 2. It should be noted that, the foregoing ports are divided according to use. These ports may be physically the same. For example, in some cases, the extended port 213 may be used as the storage service port 212, and other examples are not listed one by one. Theoretically, the internal exchange port 211 may be used as the storage service port 212 or the extended port 213, and actually, the internal exchange port 211 may be set according to a hardware form of the storage system. For example, in hardware forms shown in FIG. 4A to FIG. 4C, because the internal exchange port 211 is located in a chassis, and the storage service port 212 and the extended port 213 are located on a surface of the chassis, the internal exchange port 211 is usually not used as the storage service port 212 or the extended port 213.

The storage node 22 is a core component that provides an input/output (I/O) processing capability and storage space and that is in the storage system. For example, each storage node 22 may be provided with one or more internal ports 220, where the internal port 220 is a port connected to the internal exchange port 211 of the switch 21, and each internal port 220 may be connected to one switch 21. For example, the internal port 220 may be provided by a remote direct memory access (RDMA) network interface card or the like. If the switch 21 is an Ethernet switch, a redundant Ethernet network, also referred to as an internal Ethernet of the storage system 2, is formed. This facilitates implementation that there is still an available connection when any port or connection or switch fails.

In an implementation, the storage node shown in FIG. 2 includes: an I/O and processing module 221, and one or more storage modules 222 connected to the I/O and processing module 221.

The I/O and processing module 221 is responsible for input/output of an I/O request (including a read/write request) and execution of a related processing procedure. During specific implementation, the I/O and processing module 221 may be at least one central processing unit (CPU) that is connected to at least one RDMA network interface card by using an I/O bus. In addition, the CPU may be further connected to a particular quantity of memories. The RDMA network interface card provides an internal port 220, to connect to the switch 21. For example, the I/O bus may be, but is not limited to, a Peripheral Component Interconnect Express (PCIe) bus. It should be noted that, during physical implementation, the CPU, the I/O bus, and the RDMA network interface card herein may be partially or entirely integrated together, for example, may form a system on a chip (SoC) or a field-programmable gate array (FPGA), or may form a general component such as a general CPU (for example, a Xeon CPU) or a general RDMA network interface card. The I/O and processing module 221 is connected to the storage module 222 by using an internal I/O bus.

The storage module 222 may include at least one storage controller, and a plurality of memory chips that are connected to each storage controller. The memory chip may be a NAND flash chip, or may be another non-volatile memory chip such as a phase-change memory (PCM), a magnetic random-access memory (MRAM), or a resistive random-access memory (RRAM). The storage controller may be an application-specific integrated circuit (ASIC) chip, or may be an FPGA. Likewise, a physical form of the storage module herein may be an SSD, or may be a an SSD connecting a storage controller, a memory chip, and the I/O and processing module 221 by using the I/O bus.

In an implementation, when both the I/O and processing module 221 and the storage module 222 include general components, for example, include components such as general CPUs (for example, X86 Xeon), general RDMA network interface cards, and general SSDs, the storage node 22 is a general server.

Figure 1:
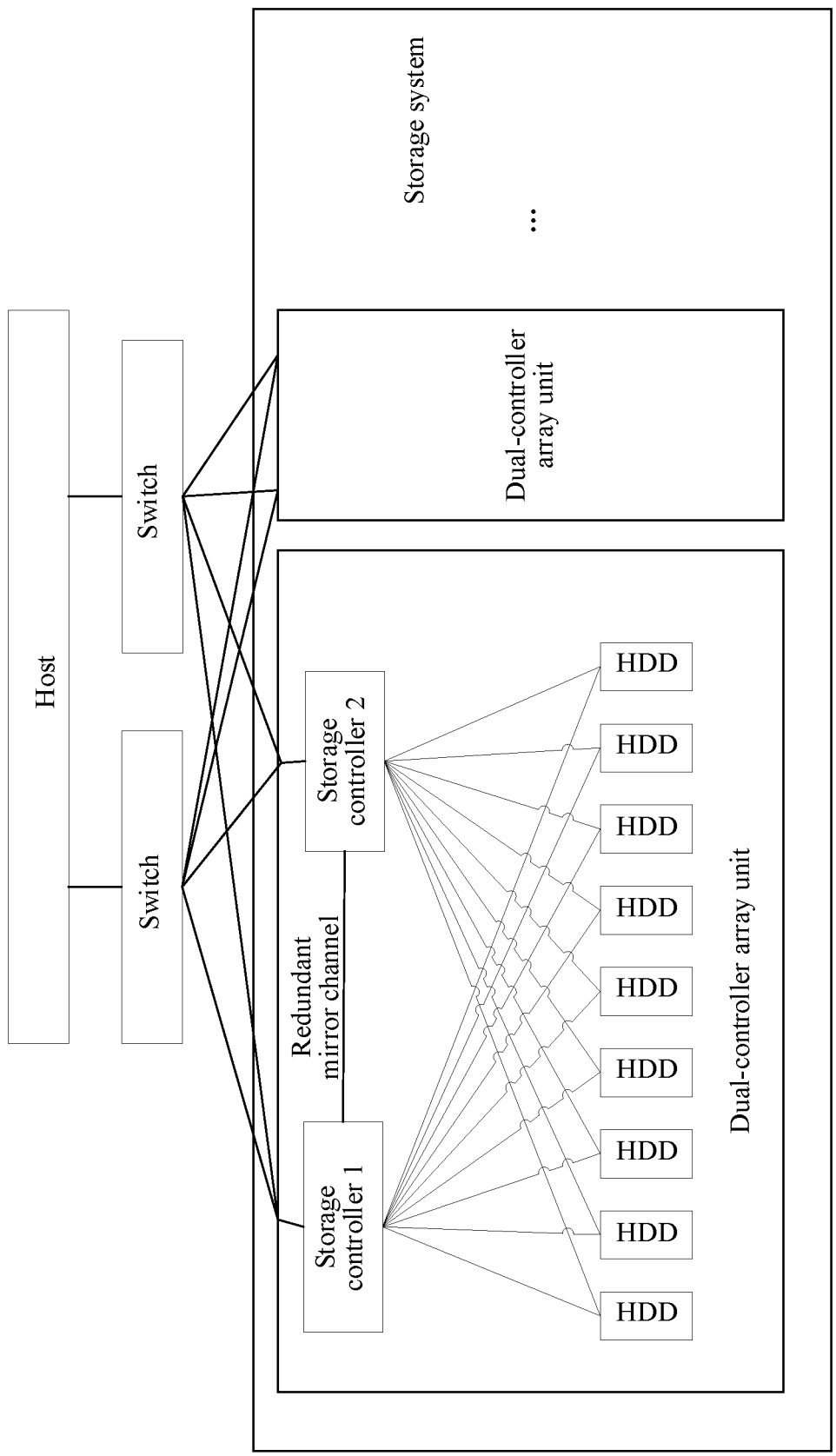
FIG. 1 is a schematic diagram of an architecture of a storage system according to some approaches.

In the technical solutions provided, the host and the storage system may access each other by using an NVMe over Fabrics (NOF) protocol. All or some of physical disks (for example, memory chips) included in each storage node may be mapped to another storage node, to be used as virtual disks of the another storage node. For example, the physical disks are mapped based on the NOF protocol. In this way, when a read/write operation is performed, a software system (that is, an instruction executed by a CPU or a memory controller) in the storage node may use these virtual disks as local physical disks. That is, this disclosure provides a distributed storage system. In this storage system, different storage nodes communicate with each other by using switches and access each other by using RDMA network interface cards in an RDMA manner provided in the NOF protocol. Therefore, compared with the system architecture shown in FIG. 1, the storage system is not limited by a processing capability of a CPU or a storage controller in a dual-controller array, and therefore a processing capability of the storage system may be greatly improved.

Figure 3:
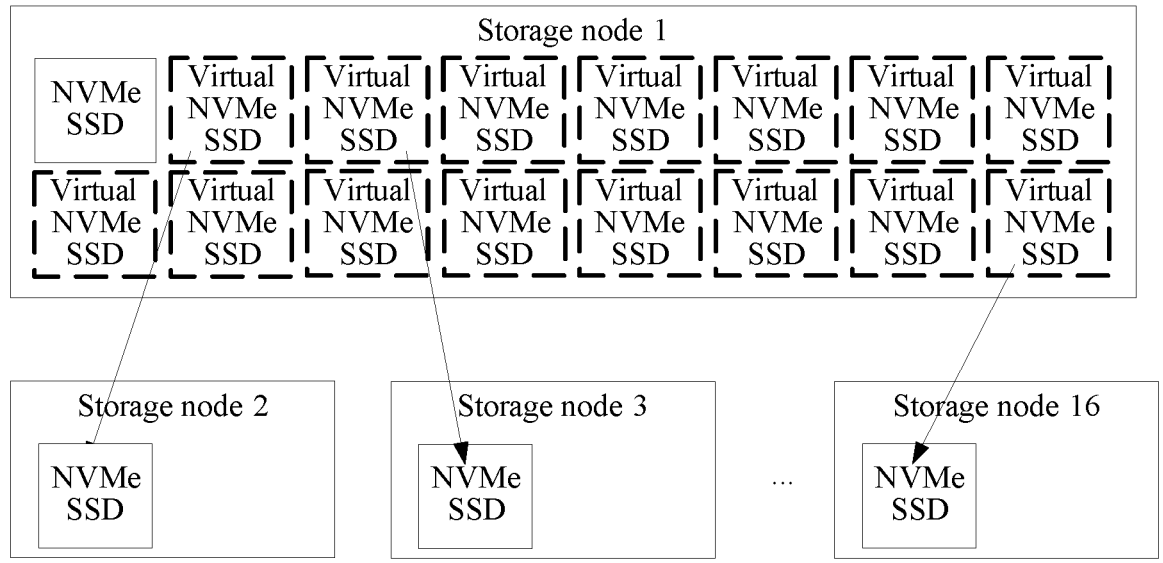
FIG. 3 is a schematic diagram of a mapping between a physical disk and a virtual disk according to an embodiment.

FIG. 3 is a schematic diagram of a mapping between a physical disk and a virtual disk. FIG. 3 is described by using an example in which a storage system includes 16 storage nodes, respectively numbered from 1 to 16, and a physical disk of each of storage nodes 2 to 15 is mapped to a storage node 1, to be used as a virtual disk of the storage node 1. In addition, that a memory chip is an NVMe SSD is used as an example for description. For example, an implementation of mapping a physical disk of each of the storage nodes 2 to 15 to the storage node 1 is: when the storage system is initialized, information about a physical disk allowed to be mapped to the storage node 1 is configured in each of the storage nodes 2 to 15, and then a connection is established between each of the storage nodes 2 to 15 and the storage node 1. After the connections are established, the storage node 1 may obtain the information about the physical disk that is allowed to be mapped to the storage node 1 and that is determined by each of the storage nodes 2 to 15, allocate a drive letter to the physical disk mapped to the storage node 1 and use the physical disk as the virtual disk of the storage node 1, and record a mapping relationship between the virtual disk and the remote physical disk. In this way, a software system of the storage node 1 may sense that there are 16 NVMe SSDs, but there is actually only one NVMe SSD in the storage node 1, and the other 15 NVMe SSDs are obtained by virtualizing NVMe SSDs of the other storage nodes based on the NOF protocol. Because of a low delay characteristic of the NOF protocol, a difference between performance when a local disk (that is, a physical disk) is accessed and performance when a virtual disk is accessed may be neglected.

The following briefly describes the NOF protocol. An objective of the NOF protocol is that an NVMe SSD may be decoupled from a local computer system, that is, a remote NVMe SSD may be connected to the local computer system by using an RDMA network interface card, and a virtual NVMe SSD is "seen" in the local computer system. Because an RDMA technology is used, there is basically no performance difference between the remote NVMe SSD (that is, the virtual NVMe SSD) and the local NVMe SSD (that is, a physical NVMe SSD). The NOF has all commands of the NVMe, and some management commands are added, for example, Authentication Send, Authentication Receive, Connect, Property Get, and Property Set. To adapt to an RDMA network, there are some changes of a data transmission manner and procedure of the NOF protocol compared with an original NVMe protocol, and the changes may specifically include: transmitting a command (for example, a read/write request)/data in an RDMA manner instead of a PCIe memory space mapping manner used by the NVMe. This is because in an NOF system, an initiator and a target cannot "see" memory space of the other party.

In an implementation, the initiator may be a host, and the target may be a storage node. In another implementation, the initiator may be a storage node, and the target may be another storage node.

In the NOF protocol, a data read procedure may include: after receiving a read request (that is, a READ command), obtaining, by the target based on the read request, address information that is to be written to a buffer of the initiator. Then, the target initiates an RDMA_WRITE operation to the initiator, to write data that is read to the buffer of the host. Next, the target initiates an RDMA_SEND operation to the initiator, to notify the initiator that the transmission is completed.

In the NOF protocol, a data write procedure may include: setting up, by the initiator, a write request (that is, a Write command), and sending the write request to the target by using the RDMA_SEND operation. After receiving the write request, the target initiates an RDMA_READ operation and obtains, from the initiator, data that is to be written in response to the write request. After receiving the data with which the initiator responds, the target initiates an RDMA_SEND operation to the initiator, to notify the initiator that the transmission is completed.

The following describes a hardware form of the storage system 2. Neither a hardware form of the switch 21 nor a hardware form of the storage node 22 is limited in this disclosure. The storage node 22 and the switch 21 may exist in one chassis. When the storage node 22 is implemented as a general server, the storage node 22 and the switch 21 may exist in one chassis. When the storage node 22 and the switch 21 exist in one chassis, the chassis may include one or more switches, one or more power supplies, a plurality of storage nodes, a backplane that connects the storage node 22 and the switch 21, and the like.

Figure 4A:
FIG. 4A is a front view of a hardware form of the system architecture shown in FIG. 2.
Figure 4B:
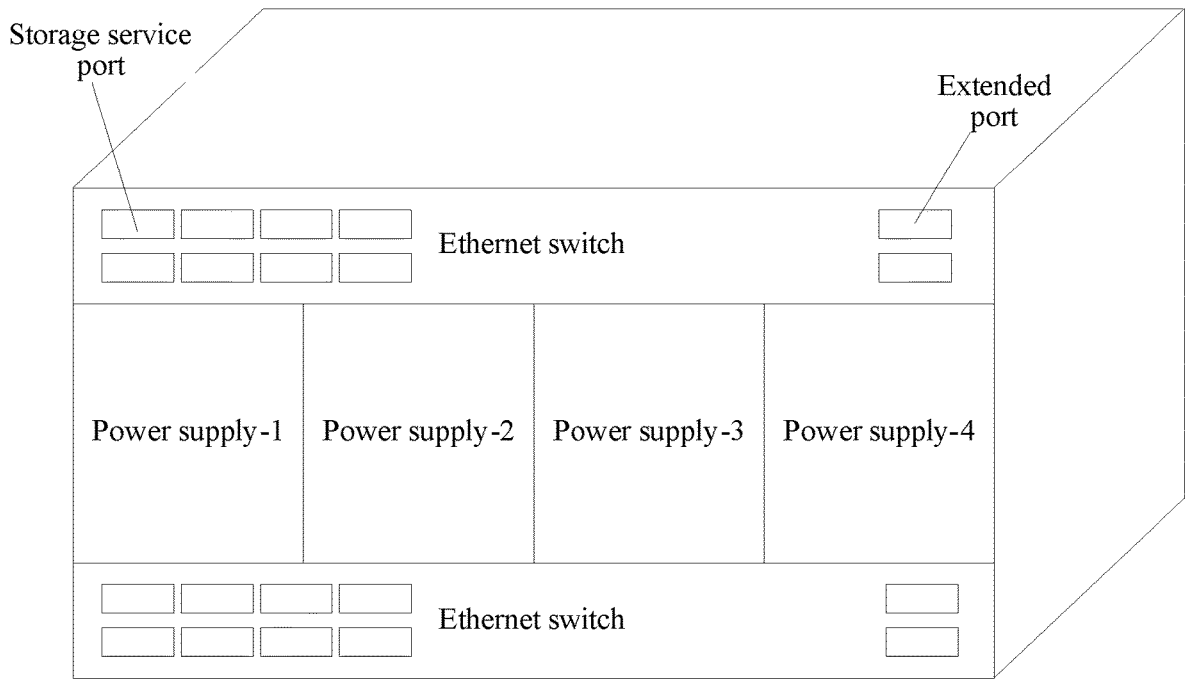
FIG. 4B is a rear view of a hardware form of the system architecture shown in FIG. 2.
Figure 4C:
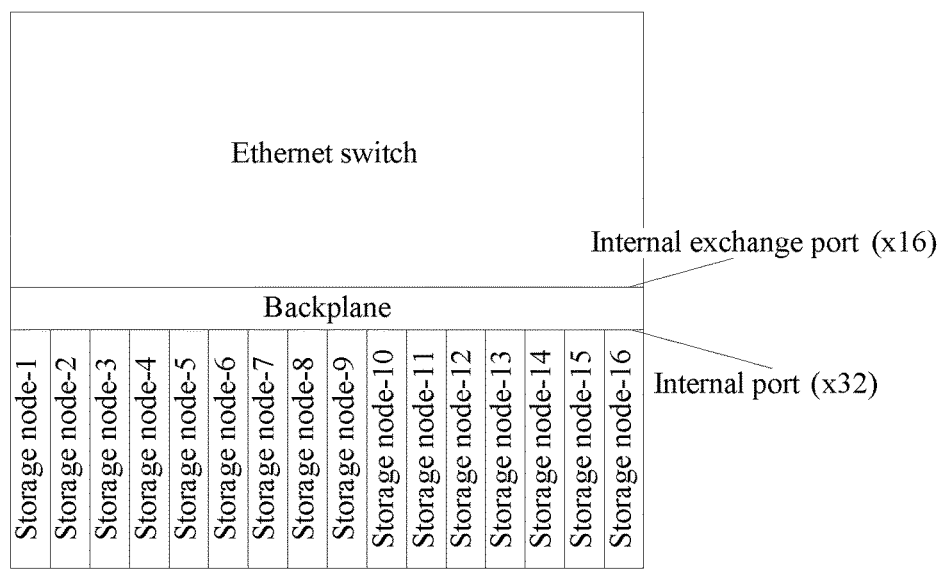
FIG. 4C is a top view of a hardware form of the system architecture shown in FIG. 2.

FIG. 4A to FIG. 4C show a hardware form of the system architecture shown in FIG. 2. FIG. 4A is a front view of a rack chassis, FIG. 4B is a rear view of the rack chassis, and FIG. 4C is a top view of the rack chassis. It can be learned from FIG. 4A to FIG. 4C that, the rack chassis includes two Ethernet switches, four redundant power supplies, 16 storage nodes, and a backplane that connects the storage nodes and the Ethernet switch.

It can be learned from the front view shown in FIG. 4A and the top view shown in FIG. 4C that, the rack chassis is provided with 16 vacant slots, and one storage node may be inserted into each vacant slot. During actual implementation, insert storage nodes may not be inserted into all the vacant slots, and to satisfy a redundancy requirement, at least two storage nodes may be inserted. Each storage node is provided with one or more carriers that are configured to insert the storage node into the vacant slot.

It can be learned from the rear view shown in FIG. 4B that, a storage service port and an extended port are provided by the Ethernet switch. The service port herein may be a port supporting various Ethernet rates (for example, 10G/40G/25G/50G/100G), and the extended port may be a port supporting a high rate (for example, 40G/50G/100G).

It can be learned from the top view shown in FIG. 4C that, an internal port of the Ethernet switch may be connected to an internal port of the storage node by using the backplane.

It should be noted that, the rack chassis shown in FIG. 4A to FIG. 4C is merely an example of the hardware form of the system architecture shown in FIG. 2, and does not constitute a limitation to the hardware form of the system architecture shown in FIG. 2.

Figure 5:
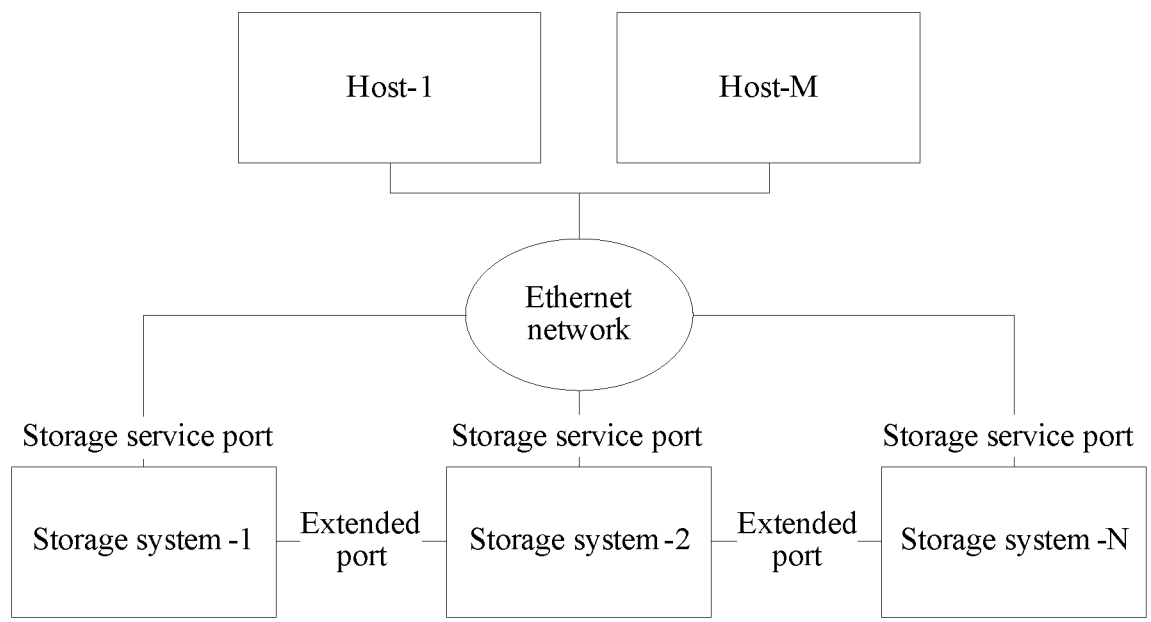
FIG. 5 is a schematic diagram of an extended system architecture of the system architecture shown in FIG. 2.

FIG. 5 provides an extended system architecture. In the system architecture, a storage system provides an external storage service by using a storage service port, and is connected to M hosts by using a network, where M is an integer greater than or equal to 1. The network herein may be a direct network or a network including switches. If the network is an Ethernet network, an external service provided by the storage system may be provided by using an Ethernet-based storage protocol that includes, but is not limited to, any one of the following: iSCSI, NOF, iSER, NFS, Samba, and the like. In addition, the storage system may perform scaling out by using an extended port. As shown in FIG. 5, the system architecture includes N storage systems, where N is an integer greater than or equal to 2. Likewise, the scaling out may be performed by using a direct network or by using switches.

The following describes, with reference to the accompanying drawings, a data read/write procedure in a system architecture provided according to this disclosure. Before this, it should be noted that, all of embodiments shown below are described by using an example in which a storage system includes 16 storage nodes, and the storage nodes are numbered from 1 to 16. This disclosure is not limited to specific implementations. In addition, it should be noted that, steps performed by each storage node may be performed by a CPU and/or a storage controller in the storage node.

Embodiment 1

Figure 6A:
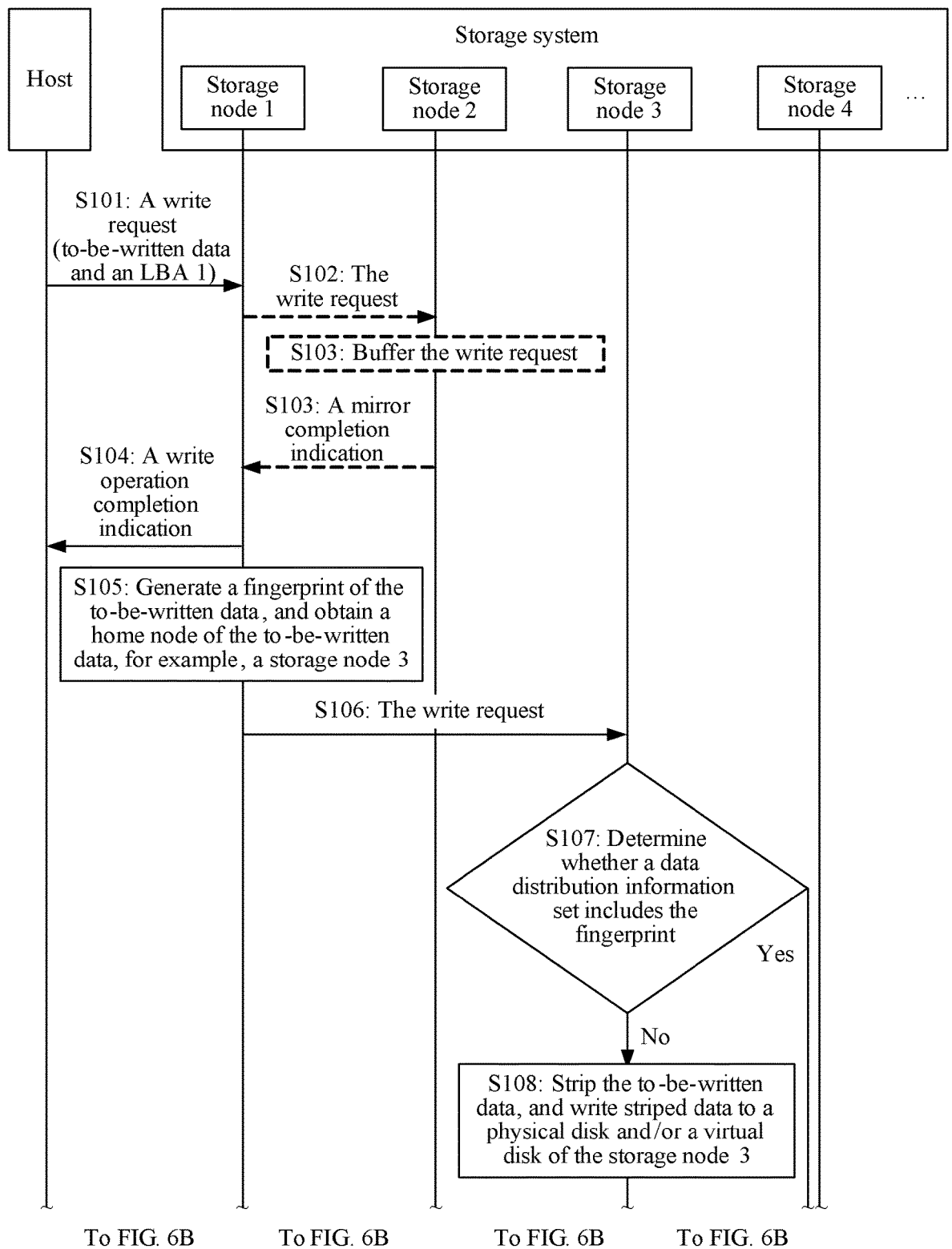
FIG. 6A and FIG. 6B are a flowchart 1 of a data write method according to an embodiment.
Figure 6B:
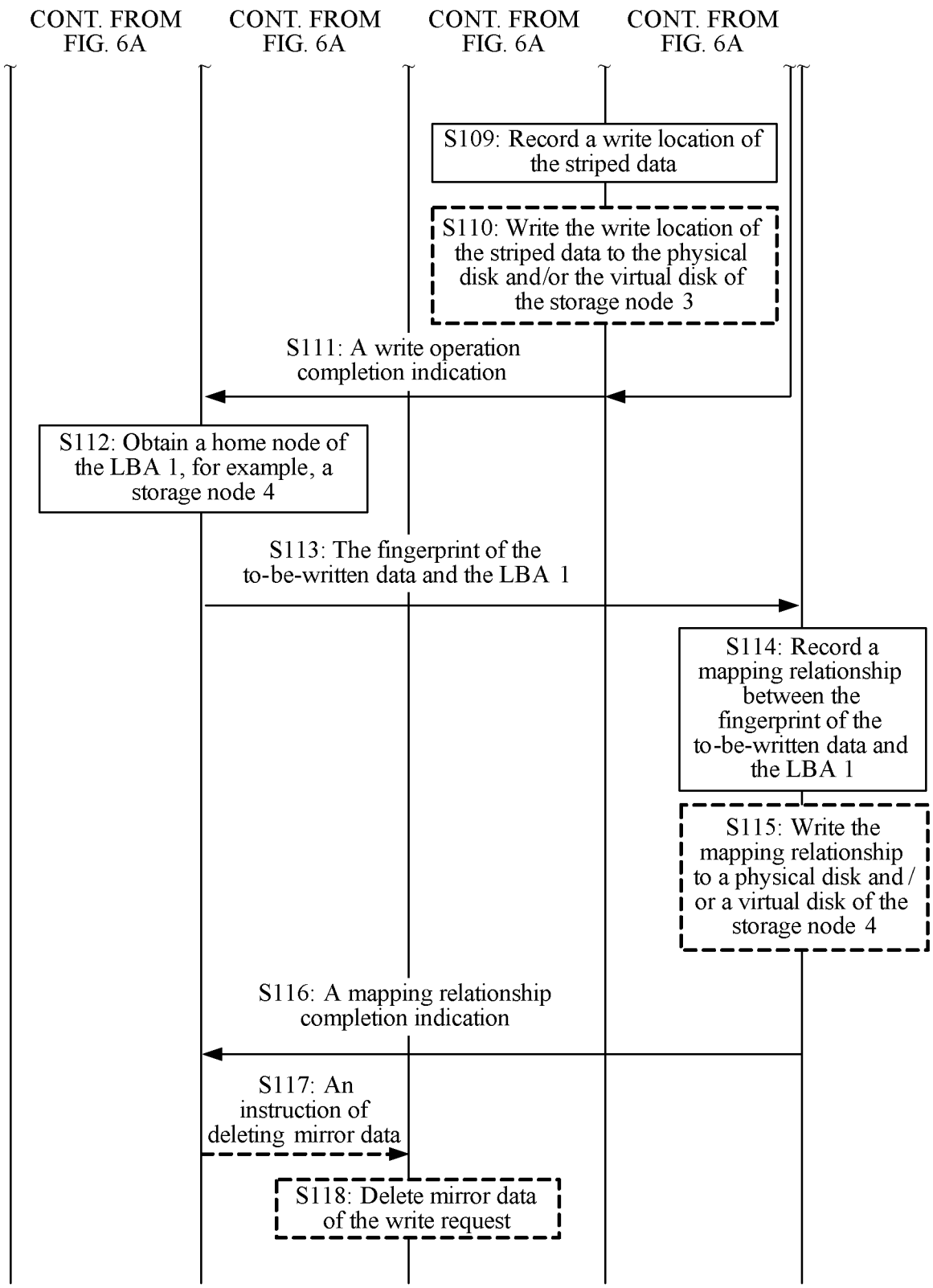

Referring to FIG. 6A and FIG. 6B, FIG. 6A and FIG. 6B are a flowchart of a data write method applied to the storage system shown in FIG. 2 according to an embodiment. Details are as follows:

S101: A host sends a write request to a storage system, where the write request includes an LBA 1 and to-be-written data. A storage node 1 in the storage system receives the write request. Specifically, the host forwards the write request to the storage node 1 by using a switch.

The storage node 1 may be any storage node in the storage system.

Usually, to avoid to-be-written data loss caused by an available storage node or the like in a write procedure, after receiving the write request from the host, the storage system backs up the write request. For details, refer to S102 and S103. It may be understood that, S102 and S103 are optional steps.

S102: The storage node 1 sends the write request to a mirror node of the storage node 1 such as a storage node 2. Specifically, the storage node 1 sends the write request to the storage node 2 by using the switch. The storage node 2 receives the write request.

Any two storage nodes in the storage system may be mirror nodes of each other. Usually, two storage nodes that are mirror nodes of each other may be preset according to a particular rule. For example, the rule may be set, but is not limited to, according to a particular rule, to implement load balancing. Load balancing herein means that a step of performing a mirror operation is performed evenly by storage nodes as much as possible. For example, two adjacently numbered storage nodes are used as mirror nodes of each other. For example, the storage node 1 and the storage node 2 are mirror nodes of each other, a storage node 3 and a storage node 4 are mirror nodes of each other, and so on.

S103: The storage node 2 buffers the write request and returns a mirror completion indication to the storage node 1, and the storage node 1 receives the mirror completion indication.

S104: After receiving the mirror completion indication, the storage node 1 sends a write operation completion indication to the host.

Usually, to make the storage system respond to the write request of the host more quickly, after mirror completion, the storage system sends the write operation completion indication to the host immediately. The storage system continues to perform some or all of the following steps S105 to S118, to write the to-be-written data in the write request.

S105: The storage node 1 generates a fingerprint of the to-be-written data, and determines a home node of the to-be-written data based on the fingerprint, for example, a storage node 3.

A fingerprint of data is used for uniquely identifying a characteristic of the data. In other words, the fingerprint of the data may be understood as an identity (ID) of the data. If two pieces of data have same fingerprints, it is considered that the two pieces of data are the same. If fingerprints of two pieces of data are different, it is considered that the two pieces of data are different. How to obtain a fingerprint of data through calculation is not limited. For example, a fingerprint may be obtained by performing a Hash operation on data. For example, the Hash operation may be, but is not limited to, a secure hash algorithm 1 (SHA-1), a cyclic redundancy check (CRC) 32, or the like. The CRC32 is a specific implementation of the CRC, and can generate a 32-bit check value. Using the SHA-1 as an example, after the Hash operation is performed on the data, a 160-bit digest is obtained, and the digest is the fingerprint of the data.

A home node of data is a storage node that performs a write operation on the data. How to determine a home node of data is not limited. Specifically, for example, a home node of data may be specifically determined based on, but is not limited to, a particular algorithm, to implement load balancing. Load balancing herein means that a step of performing a write operation is performed evenly by storage nodes as much as possible. For example, the algorithm may be a modulo operation. Specifically, the modulo operation is performed on a fingerprint, and if an obtained value is a, the home node of the data is a storage node a+1, where a≥0, a is an integer, and the storage nodes in the storage system are numbered from 1. For example, if there are totally 16 storage nodes in the storage system, and a fingerprint of the data is 65537, the modulo operation may be performed on 65537 based on 16, and 1 is obtained, that is, the home node of the data is the storage node 2.

It should be noted that, a home node of to-be-written data is determined based on a fingerprint of the data, and a mirror node of the storage node 1 is determined based on the storage node 1, so that there is no association relationship between the home node of to-be-written data and the mirror node of the storage node 1. The home node of the to-be-written data and the mirror node of the storage node 1 may be a same storage node or may be different storage nodes. In this embodiment, that the home node of the to-be-written data and the mirror node of the storage node 1 are different storage nodes is used as an example for description.

It may be understood that, the storage node (in this embodiment, the storage node 1 is used as an example) that receives the write request sent by the host may also be used as the home node of the to-be-written data carried in the write request. For example, based on the foregoing examples, if the fingerprint of the to-be-written data is 65536, a modulo operation may be performed on 65536 based on 16, and 0 is obtained, that is, the home node of the to-be-written data is the storage node 1.

S106: The storage node 1 forwards the write request to the home node (for example, the storage node 3) of the to-be-written data, and the storage node 3 receives the write request.

S107: The storage node 3 queries a data distribution information set, and determines whether the set includes the fingerprint of the to-be-written data.

If the set does not include the fingerprint of the to-be-written data, it indicates that the storage system has not stored the to-be-written data, and S108 is performed. If the set includes the fingerprint of the to-be-written data, it indicates that the storage system has stored the to-be-written data, and S111 is performed, to avoid repeated storage and save storage space.

The home node of the data may manage the data distribution information set. A quantity of data distribution information included in the data distribution information set managed by the home node of the data is increased as a quantity of IO operations performed by the storage node. At an initial moment (that is, when the storage node does not perform the write operation), it may be considered that the data distribution information set managed by the storage node is empty, or it may be considered that the data distribution information set managed by the storage node has not been established in the storage system. At another moment, each data distribution information set may include at least one piece of data distribution information. The data distribution information may be represented by using a metadata table M1, and related descriptions of the M1 are as follows:

S108: The storage node 3 strips the to-be-written data to obtain striped data, and writes the striped data to a physical disk and/or a virtual disk of the storage node 3.

The step may be understood as performing redundancy processing on data, and a basic principle of the step is: dividing a piece of complete data (which is specifically data carried in a write request), to obtain a plurality of data blocks, and optionally, one or more parity blocks may be generated. Then, these data blocks and parity blocks are stored in different disks (that is, magnetic disks). The striped data in S108 may include data blocks, and may further include parity blocks. A redundancy processing manner is not limited. For example, the manner of redundancy processing may be, but is not limited to, redundant array of independent disks (RAID) or erasure coding (EC).

Because a physical disk of one or more storage nodes may be mapped to a virtual disk of a same storage node, the virtual disk may be used as a local disk when data is written to the storage node 3. In this way, the storage node 3 may select the virtual disk as a disk to which striped data is written. When the data is written to the virtual disk, the storage node 3 may first determine a physical disk that is of another storage node and that is mapped to the virtual disk, and then in an RDMA manner and based on the NOF protocol, write a data block that is written to the virtual disk to the determined physical disk of the another storage node.

For example, the storage system includes 16 storage nodes and the redundancy processing manner is the EC. One possible implementation is: The storage node 3 strips the to-be-written data based on an EC algorithm, to obtain 14 data blocks and two parity blocks. Then, each of the 16 blocks is written to one storage node in the storage system.

S109: The storage node 3 records a write location of the striped data. Specifically, the storage node 3 may record the write location of the striped data by recording distribution information of the to-be-written data.

The data distribution information may be represented by using the metadata table M1, and elements that are included in the metadata table M1 may be shown in Table 1.

TABLE 1

| Element | Description |
| --- | --- |
| FingerPrint | A fingerprint of data |
| hostLBA | An LBA carried in a write request |
| hostLength | A total length of data |
| Seg.type | Whether each block in striped data is a data block or a parity block |
| Seg.diskID | An ID of a disk (may be a virtual disk or a physical disk) to which each block in the striped data is written |
| Seg.startLBA | A start LBA of each block in the striped data in the disk to which each block is written |
| Seg.length | A length of each block in the striped data |

FingerPrint, Seg.diskID, Seg.startLBA, and Seg.length may be used for representing a write location of striped data of a piece of data.

It should be noted that, hostLBA represents an LBA used during information exchange between a host and a storage system. Seg.startLBA represents a start LBA address of written data in a storage module. This disclosure does not limit recording manners of the elements in Table 1. For example, if all blocks in the striped data are of a same length, only one length is recorded. Other examples are not listed one by one.

For example, based on the example in S108, after step S109 is performed, the distribution information that is of the to-be-written data and that is recorded by the storage node 3 may include information such as the fingerprint of the to-be-written data, the LBA 1, a total length of the to-be-written data, a type of each of 14 data blocks and two redundant blocks of the to-be-written data, and an ID and a length of a disk to which data is written.

S108 and S109 may be referred to as that a home node of data performs a write operation in response to a write request/to-be-written data. To improve reliability, the home node of the data may perform redundancy processing on the metadata table M1. For details, refer to S110. It may be understood that, S110 is an optional step.

S110: The storage node 3 writes the write location of the striped data to the physical disk and/or the virtual disk of the storage node 3. Specifically, the storage node 3 may write the write location of the striped data to the physical disk and/or the virtual disk of the storage node 3 by writing the distribution information of the to-be-written data to the physical disk and/or the virtual disk of the storage node 3.

The step may be understood as performing redundancy processing on data distribution information. It may be understood that, the step is an optional step. A redundancy processing manner is not limited. For example, the manner is, but is not limited to, a manner such as multi-copy, EC, or RAID. Using triplicate copies as an example, the storage node 3 may save one copy of distribution information of the to-be-written data locally, then select two storage nodes from the storage system, subsequently make two copies of the distribution information of the to-be-written data, and write each copy to one of the two storage nodes. How to select the two storage nodes is not limited. For example, the selection is performed by using, but is not limited to, a modulo operation.

S111: The storage node 3 feeds back a write operation completion indication to the storage node 1, and the storage node 1 receives the write operation completion indication.

It may be understood that, in S105, if the home node that is of the to-be-written data and that is determined by the storage node 1 is the storage node 1, S106 and S111 may be not performed, and S107 to S111 are performed by the storage node 1.

S112: The storage node 1 obtains a home node of the LBA 1 carried in the write request, for example, a storage node 4.

A home node of an LBA is configured to manage a mapping relationship between the LBA and a fingerprint. How to determine a home node of an LBA is not limited. For example, a home node of an LBA may be specifically determined based on, but is not limited to, a particular algorithm, to implement load balancing. Load balancing herein means that a step of managing a mapping relationship between an LBA and a fingerprint is performed evenly by storage nodes as much as possible. For example, the algorithm may be a modulo operation.

It should be noted that, the home node of the data is determined based on the fingerprint of the data, and the home node of the LBA is determined based on the LBA. Therefore, there is no association relationship between the home node of the data and the home node of the LBA, and the home node of the data and the home node of the LBA may be a same storage node or may be different storage nodes. There is no association relationship between the home node of the LBA and the mirror node of the storage node 1. In this embodiment, that both the home node of the LBA 1 and the home node of the to-be-written data are different from the mirror node of the storage node 1 is used as an example for description.

S113: The storage node 1 sends the fingerprint of the to-be-written data and the LBA 1 carried in the write request to the storage node 4.

S114: The storage node 4 records a mapping relationship between the fingerprint of the to-be-written data and the LBA 1 carried in the write request.

The mapping relationship may be represented by using a metadata table M2. Elements that are included in the metadata table M2 may be shown in Table 2.

TABLE 2

| Element | Description |
| --- | --- |
| FingerPrint | A fingerprint |
| LBA list | An LBA list corresponding to the fingerprint |
| NodeID | An ID of a home node of data indicated by the fingerprint |

In an implementation, the metadata table M2 can include only the foregoing FingerPrint and LBA list.

One LBA list may include one or more LBAs. The LBA list may be represented as a single linked list. A mapping relationship may exist between a same fingerprint and a plurality of LBAs. For example, it is assumed that a host sends four write requests to a storage system, and related information of the four write requests is shown in Table 3.

TABLE 3

| Write request | Carried information | Home node of LBA | Home node of data |
| --- | --- | --- | --- |
| Write request 1 | LBA 1, to-be-written data 1 | Storage node A | Storage node C |
| Write request 2 | LBA 2, to-be-written data 1 | Storage node A | Storage node C |
| Write request 3 | LBA 3, to-be-written data 1 | Storage node B | Storage node C |
| Write request 4 | LBA 4, to-be-written data 2 | Storage node A | Storage node D |

Based on Table 3, after the storage system executes the four write requests, the metadata table M2 recorded by the storage node A is shown in Table 4.

TABLE 4

| Fingerprint | LBA list corresponding to the fingerprint | Home node of data indicated by the fingerprint |
| --- | --- | --- |
| A fingerprint of to-be-written data 1 | LBA 1 and LBA 2 | Storage node C |
| A fingerprint of to-be-written data 2 | LBA 4 | Storage node D |

Based on Table 3, after the storage system executes the four write requests, the metadata table M2 recorded by the storage node B is shown in Table 5.

TABLE 5

| Fingerprint | LBA list corresponding to the fingerprint | Home node of data indicated by the fingerprint |
| --- | --- | --- |
| A fingerprint of to-be-written data 1 | LBA 3 | Storage node C |

S115: The storage node 4 writes the mapping relationship between the fingerprint of the to-be-written data and the LBA 1 carried in the write request to a physical disk and/or a virtual disk of the storage node 4.

The step may be understood as performing redundancy processing on the mapping relationship between the fingerprint of the to-be-written data and the LBA 1 carried in the write request. It may be understood that, the step is optional. A redundancy processing manner is not limited. Examples may be referred to the foregoing description.

S116: The storage node 4 feeds back a mapping relationship completion indication to the storage node 1, and the storage node 1 receives the mapping relationship completion indication.

In this way, when to-be-written data is read subsequently, pieces of data having a same fingerprint are prevented from being read at a same node, thereby preventing congestion. If the LBA is distributed at different nodes, when a read operation is subsequently performed on data, the to-be-written data may be read from the home node of the LBA. For details, refer to the data read procedure described in FIG. 7.

S117: The storage node 1 sends an instruction of deleting mirror data to the mirror node (for example, the storage node 2) of the storage node 1, and the storage node 2 receives the instruction.

S118: After receiving the instruction, the storage node 2 deletes mirror data in the write request.

Until now, the write procedure ends.

Figure 7:
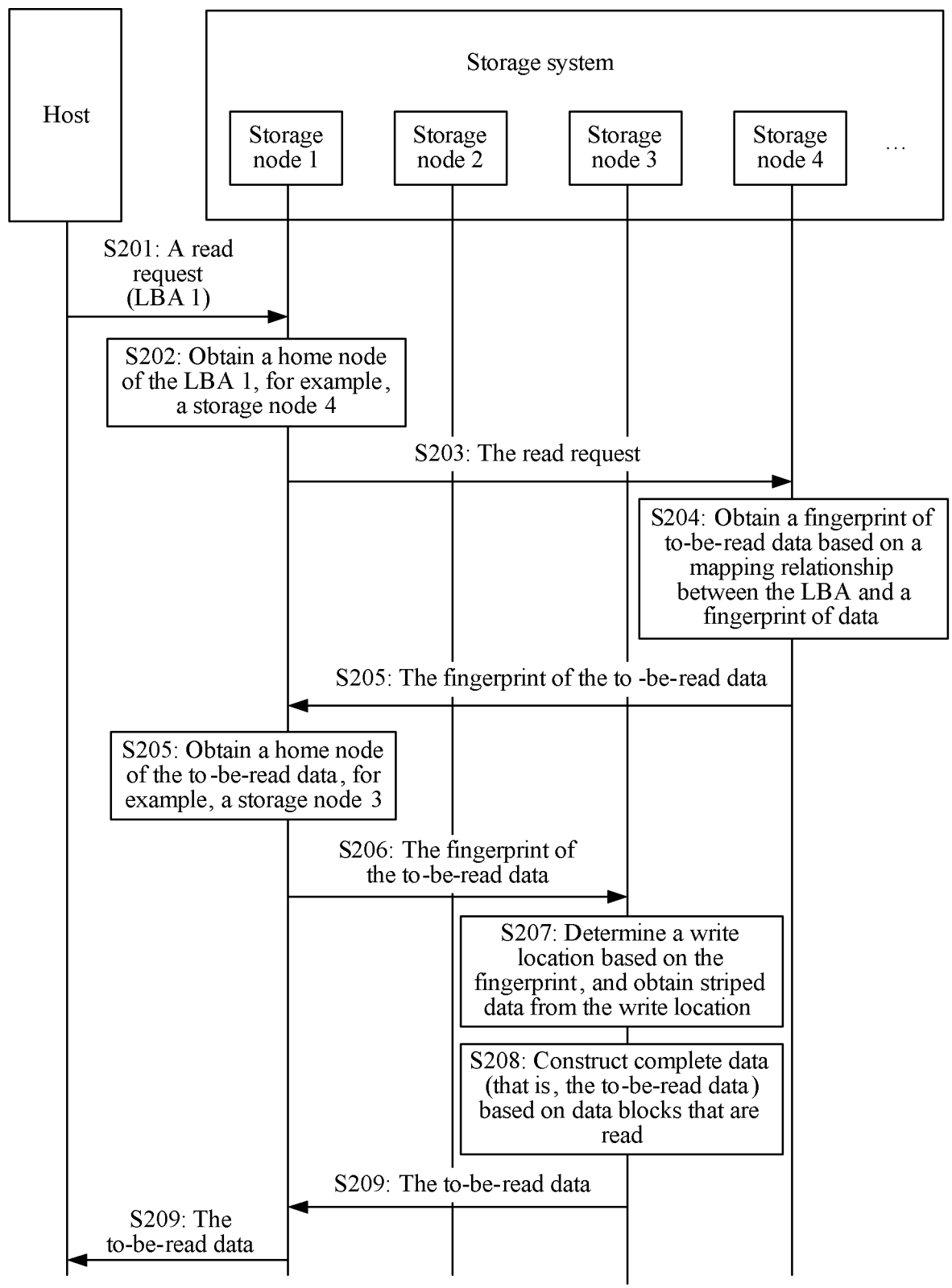
FIG. 7 is a flowchart of a data read method in FIG. 6A and FIG. 6B according to an embodiment.

Referring to FIG. 7, FIG. 7 is a flowchart of a data read method applied to the storage system shown in FIG. 2 according to an embodiment. Details are as follows:

S201: A host sends a read request to a storage system, where the read request carries an LBA 1. A storage node 1 in the storage system receives the read request. Specifically, the host sends the read request to a switch, and after receiving the read request, the switch forwards the read request to the storage node 1.

It should be noted that, in Embodiment 1, both the data write procedure shown in FIG. 6A and FIG. 6B and the data read procedure shown in FIG. 7 are described by using an example in which a storage node 1 receives a request (including a write request and a read request) from a host. During actual implementation, because both the data write procedure and the data read procedure shown in Embodiment 1 are designed based on an idea that a switch forwards a write request/read request to any storage node, in the data write procedure and the data read procedure, a storage node that receives the write request may be different from a storage node that receives the read request sent by the host.

S202: The storage node 1 obtains a home node of the LBA 1. For a specific implementation of obtaining the home node of the LBA 1, refer to the foregoing description, and details are not described herein again. It can be learned based on the foregoing description that, the determined home node of the LBA 1 is a storage node 4.

S203: The storage node 1 sends the read request to the storage node 4, and the storage node 4 receives the read request.

S204: The storage node 4 obtains a fingerprint of to-be-read data based on a mapping relationship between the LBA and a fingerprint of data. The mapping relationship is shown in a table such as the metadata table M2 shown in Table 2. The fingerprint of the to-be-read data is the fingerprint of the to-be-written data in the foregoing description. Optionally, the storage node 4 may further obtain a home node of the to-be-read data. It can be learned based on the foregoing description that the determined home node of the to-be-read data is a storage node 3.

S205: The storage node 4 feeds back the fingerprint of the to-be-read data to the storage node 1, and the storage node 1 receives the fingerprint of the to-be-read data and determines the home node of the to-be-read data, that is, the storage node 3, based on the fingerprint of the to-be-read data. Optionally, the storage node 4 may further feed back an ID of the home node of the to-be-read data, that is, an ID of the storage node 3, to the storage node 1. In this way, the storage node 1 does not need to obtain the home node of the to-be-read data based on the fingerprint, and therefore computational complexity of the storage node 1 can be reduced.

S206: The storage node 1 sends the fingerprint of the to-be-read data to the storage node 3, and the storage node 3 receives the fingerprint of the to-be-read data.

S207: The storage node 3 determines a write location of striped data of the to-be-read data based on the fingerprint of the to-be-read data, and obtains the write location of the striped data based on a table such as the metadata table M1 shown in Table 1. Then, some or all of the striped data is obtained from the write location.

It may be understood that, in a normal data read process, only a data block of the to-be-read data needs to be read, and a parity block does not need to be read. Optionally, in a scenario in which data needs to be recovered, the parity block of the to-be-read data may be read, and then, for example, the data may be recovered based on an RAID or EC algorithm or the like.

S208: The storage node 3 constructs complete data based on data blocks that are read, that is, data before the striping is performed. Until now, it is considered that the storage node 3 obtains the to-be-read data. The storage node 3 feeds back the to-be-read data to the storage node 1, and the storage node 1 receives the to-be-read data.

S209: After receiving the to-be-read data, the storage node 1 feeds back the to-be-read data to the host.

The data read procedure shown in FIG. 7 is described based on the data write procedure shown in FIG. 6A and FIG. 6B. A person skilled in the art should be capable of determining, based on the data read procedure shown in FIG. 7, embodiments in the following scenario: a scenario in which the home node of the LBA 1 is the same as the storage node 1, and/or, a scenario in which the home node of the to-be-read data is the same as the storage node 1, and/or, a scenario in which the home node of the LBA 1 is the same as the home node of the to-be-read data. The scenarios are not described herein one by one again.

In the data read/write procedure according to this embodiment, the step of performing the read/write operation is allocated to the storage node of the storage system based on the fingerprint of the data, and the step of managing the fingerprint and the LBA of the host is allocated to the storage node of the storage system based on the LBA. In this way, this embodiment helps implement load balancing, thereby improving system performance.

Embodiment 2

Figure 8A:
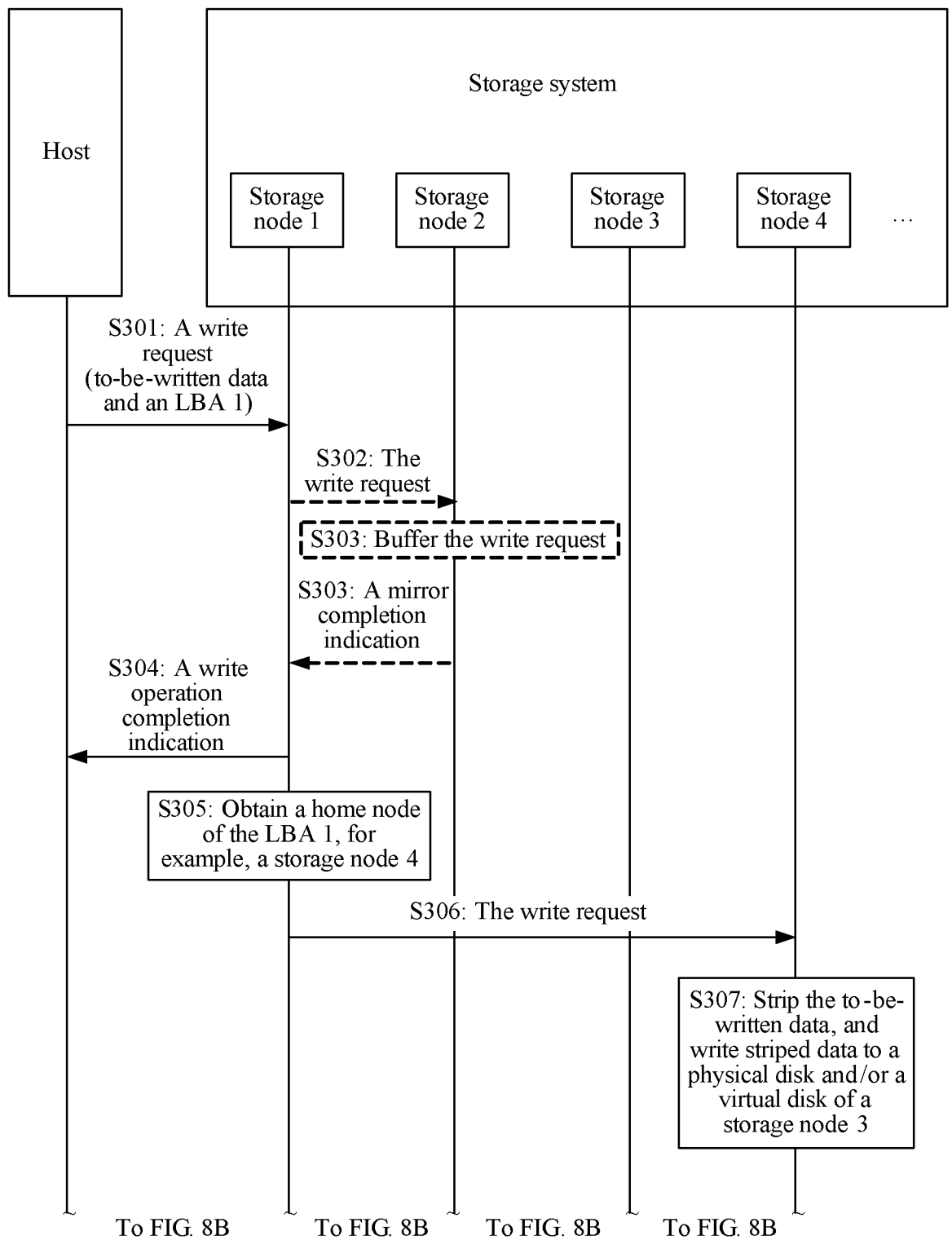
FIG. 8A and FIG. 8B are a flowchart 2 of a data write method according to an embodiment.
Figure 8B:
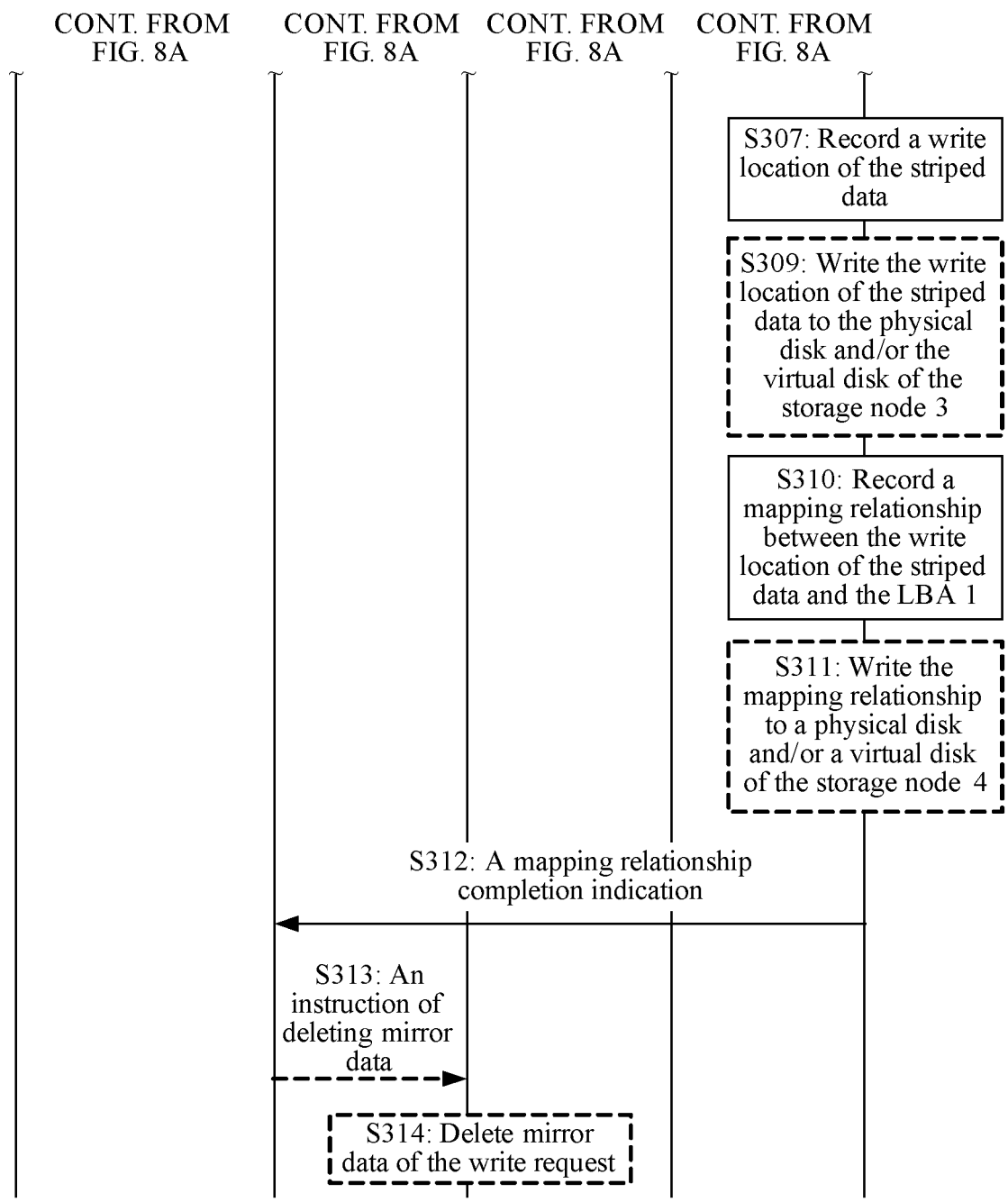

Referring to FIG. 8A and FIG. 8B, FIG. 8A and FIG. 8B are a flowchart of a data write method applied to the storage system shown in FIG. 2 according to an embodiment. Details are as follows:

For S301 to S304, refer to S101 to S104. The disclosure is not limited thereto.

For S305, refer to S112. The disclosure is not limited thereto.

S306: The storage node 1 sends the write request to the storage node 4, and the storage node 4 receives the write request.

S307: The storage node 4 strips the to-be-written data to obtain striped data, and writes the striped data to a physical disk and/or a virtual disk of the storage node 4.

S308: The storage node 4 records a write location of the striped data. Specifically, the storage node 4 may record the write location of the striped data by recording distribution information of the to-be-written data.

The data distribution information may be represented by using a metadata table M3, and elements that are included in the metadata table M3 may be in a table obtained by removing FingerPrint from Table 1.

S309: The storage node 4 writes the write location of the striped data to the physical disk and/or the virtual disk of the storage node 4.

For related descriptions of steps S307 to S309, refer to S108 to S110, and details are not described herein again.

S310: The storage node 4 records a mapping relationship between the write location of the striped data and the LBA 1.

S311: The storage node 4 writes the mapping relationship between the write location of the striped data and the LBA 1 to the physical disk and/or the virtual disk of the storage node 4.

For S312 to S314, refer to S116 to S118. The disclosure is not limited thereto.

Figure 9:
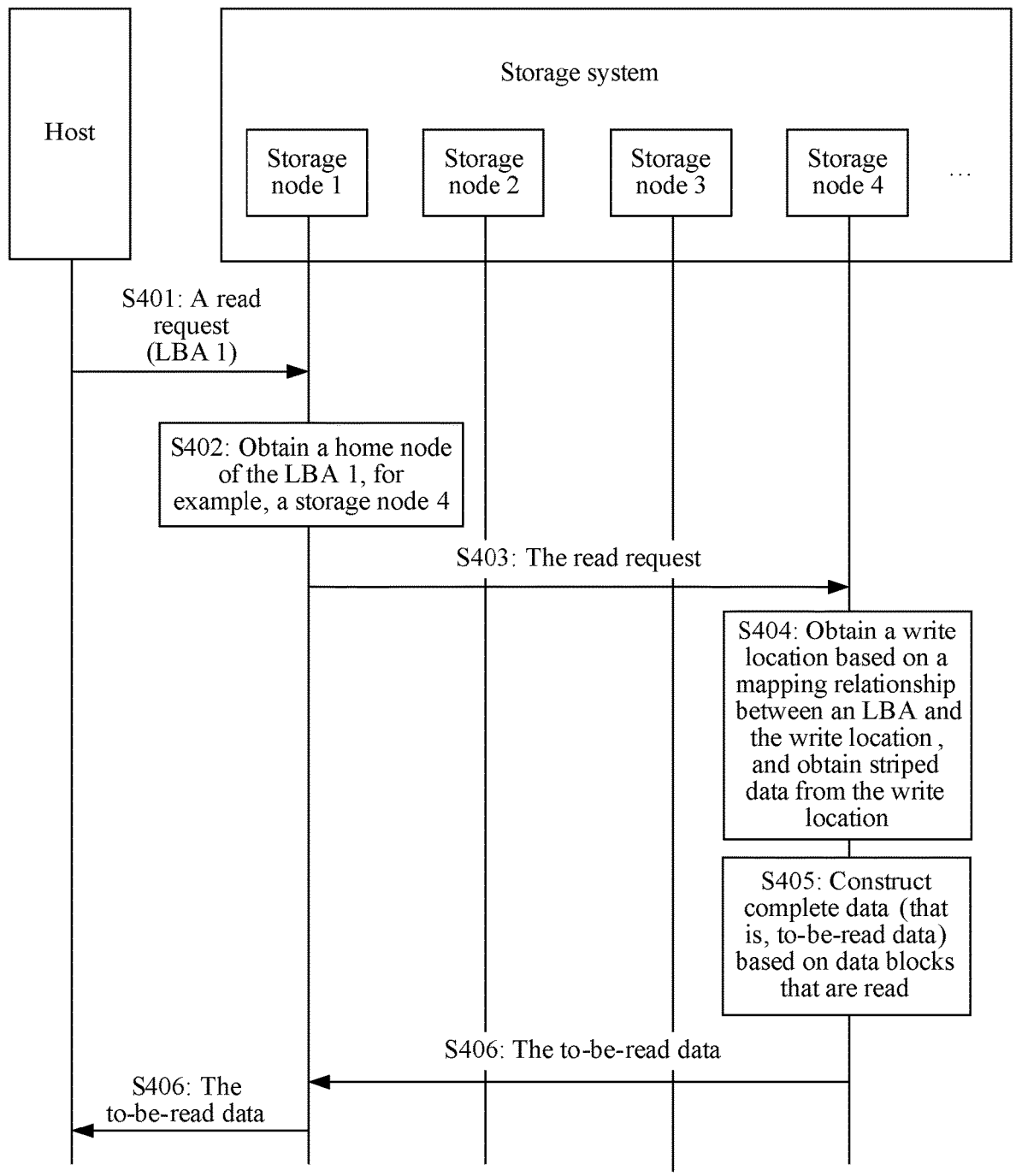
FIG. 9 is a flowchart of a data read method in FIG. 8A and FIG. 8B according to an embodiment.

Referring to FIG. 9, FIG. 9 is a flowchart of a data read method applied to the storage system shown in FIG. 2 according to an embodiment. Details are as follows:

For 401 to S403, refer to S201 to S203. The disclosure is not limited thereto.

S404: The storage node 4 determines a write location of striped data of the to-be-read data based on the LBA 1, and obtains the write location of the striped data of the to-be-read data based on a table such as a metadata table obtained by deleting a fingerprint of data from Table 1. Then, some or all of the striped data is obtained from the write location.

S405: The storage node 4 constructs complete data based on data blocks that are read, that is, data before the striping is performed. Until now, it is considered that the storage node 4 obtains the to-be-read data. The storage node 4 feeds back the to-be-read data to the storage node 1.

For S406, refer to S209. The disclosure is not limited thereto.

The data read procedure shown in FIG. 9 is described based on the data write procedure shown in FIG. 8A and FIG. 8B. A person skilled in the art should be capable of determining, based on the data read procedure shown in FIG. 9, embodiments in the following scenario: a scenario in which the home node of the LBA 1 is the same as the storage node 1. Details are not described herein again.

In this embodiment, the step of managing the write location of the data and the LBA of the host is allocated to the storage node of the storage system based on the LBA. In this way, this embodiment helps implement load balancing, thereby improving system performance.

Embodiment 3

Figure 10A:
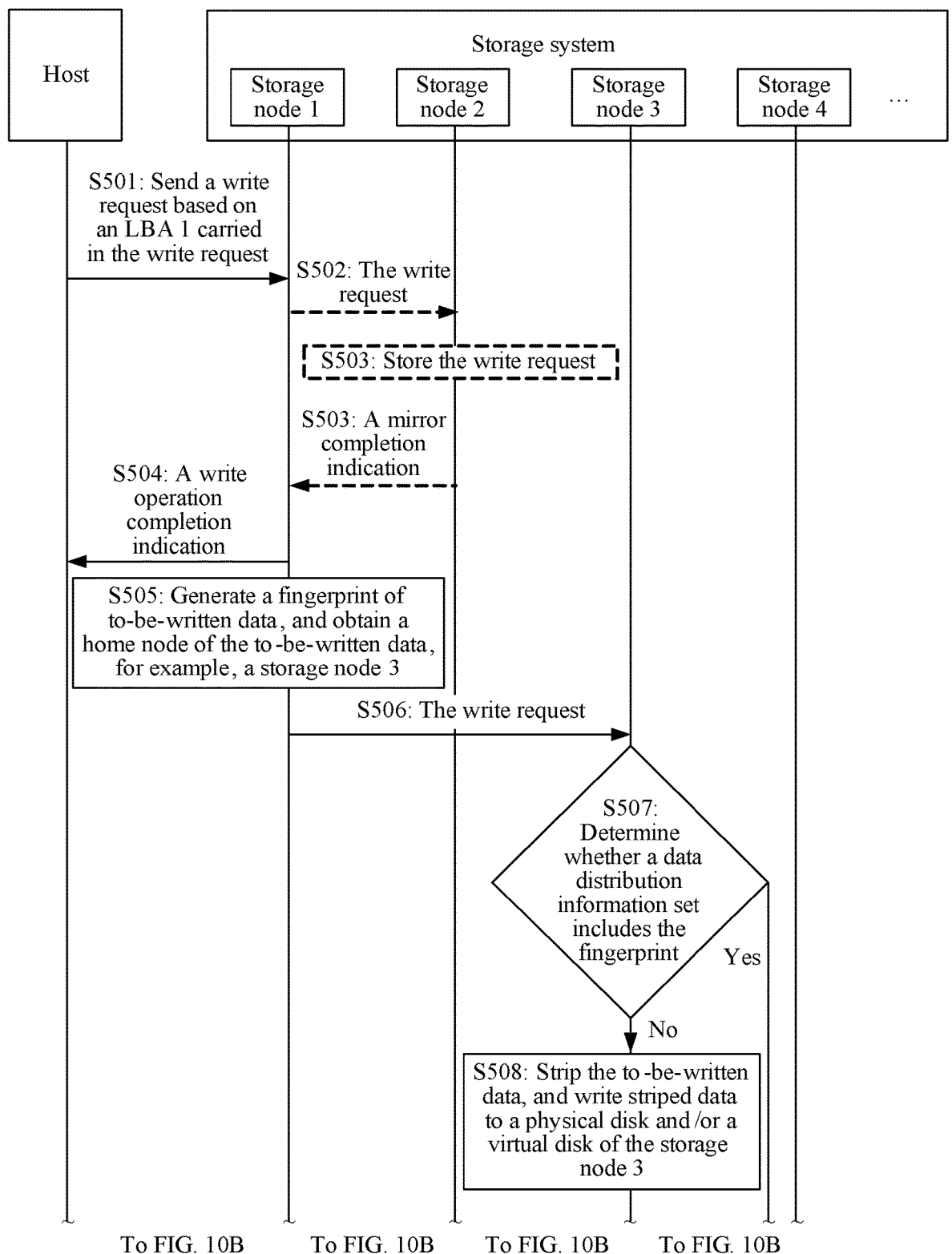
FIG. 10A and FIG. 10B are a flowchart 3 of a data write method according to an embodiment.
Figure 10B:
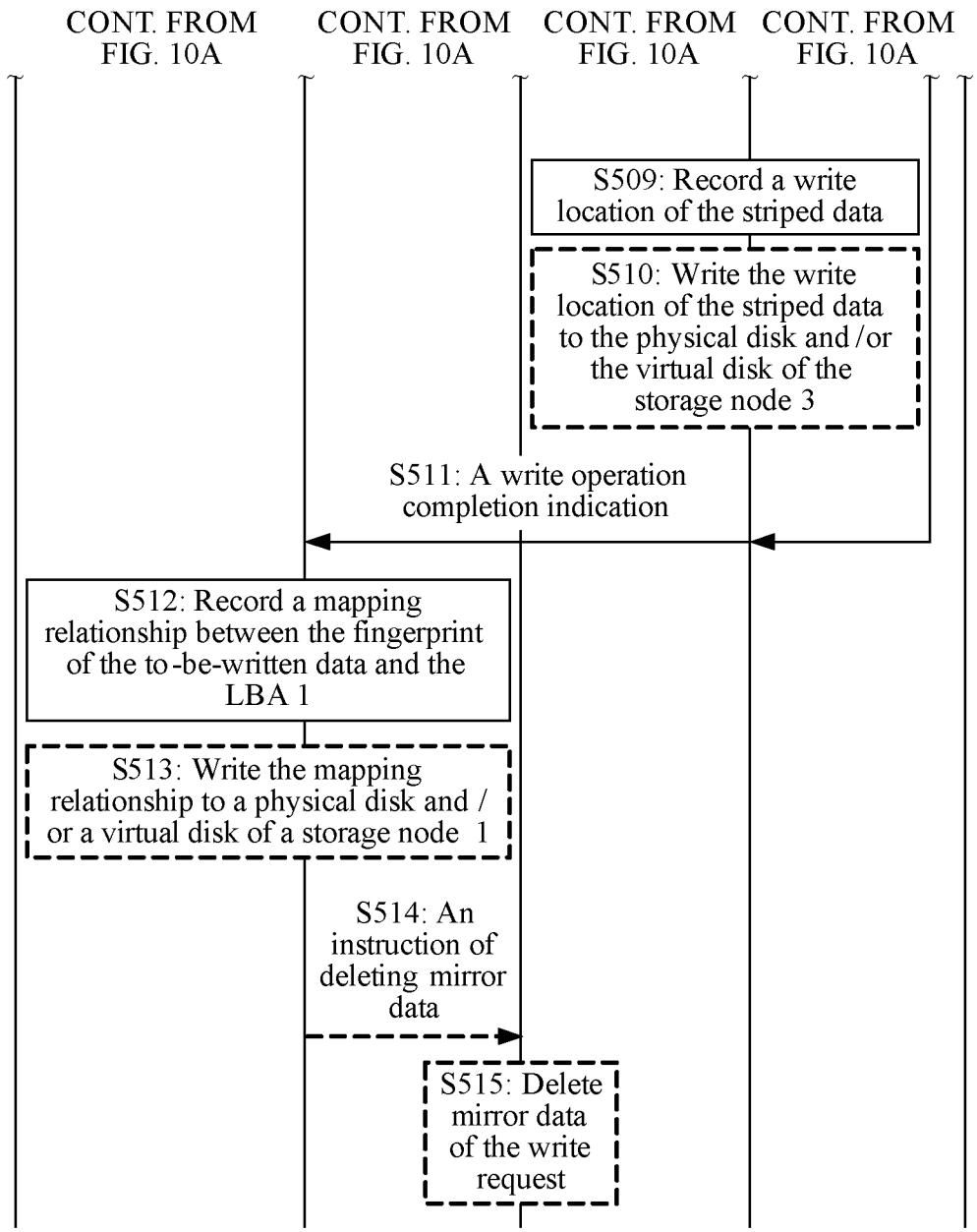

Referring to FIG. 10A and FIG. 10B, FIG. 10A and FIG. 10B are a flowchart of a data write method applied to the storage system shown in FIG. 2 according to an embodiment. Details are as follows:

S501: A host sends a write request to a storage system, where the write request includes an LBA 1 and to-be-written data. A storage node 1 in the storage system receives the write request. Specifically, the host sends the write request to a switch, and after receiving the write request, the switch forwards the write request to the storage node 1 based on information carried in the write request.

Different from Embodiment 1 and Embodiment 2, in this embodiment, the host may first send a write request that carries a particular LBA to a particular storage node, so that computational complexity of the storage system can be reduced.

In an example, the host may pre-store a correspondence between an LBA range and a storage node, for example, LBAs 1 to 100 correspond to a storage node 1, LBAs 101 to 200 correspond to a storage node 2, . . . , and then, information about a storage node corresponding to an LBA is carried in a write request. For example, the information about the storage node may include, but is not limited to, a network address of the storage node. Optionally, the information about the storage node may further include an ID of the storage node. In this way, when receiving a write request, a switch may determine, based on information that is about a storage node and that is carried in the write request, a storage node to which the write request is forwarded.

For S502 to S511, refer to S102 to S111. The disclosure is not limited thereto.

S512: The storage node 1 records a mapping relationship between a fingerprint of the to-be-written data and the LBA 1 carried in the write request.

S513: The storage node 1 writes the mapping relationship between the fingerprint of the to-be-written data and the LBA 1 carried in the write request to a physical disk and/or virtual disk of the storage node 1.

For explanations of related content of S512 and S513, refer to S114 and S115, and details are not described herein again.

For S514 and S515, refer to S117 and S118. The disclosure is not limited thereto.

Figure 11:
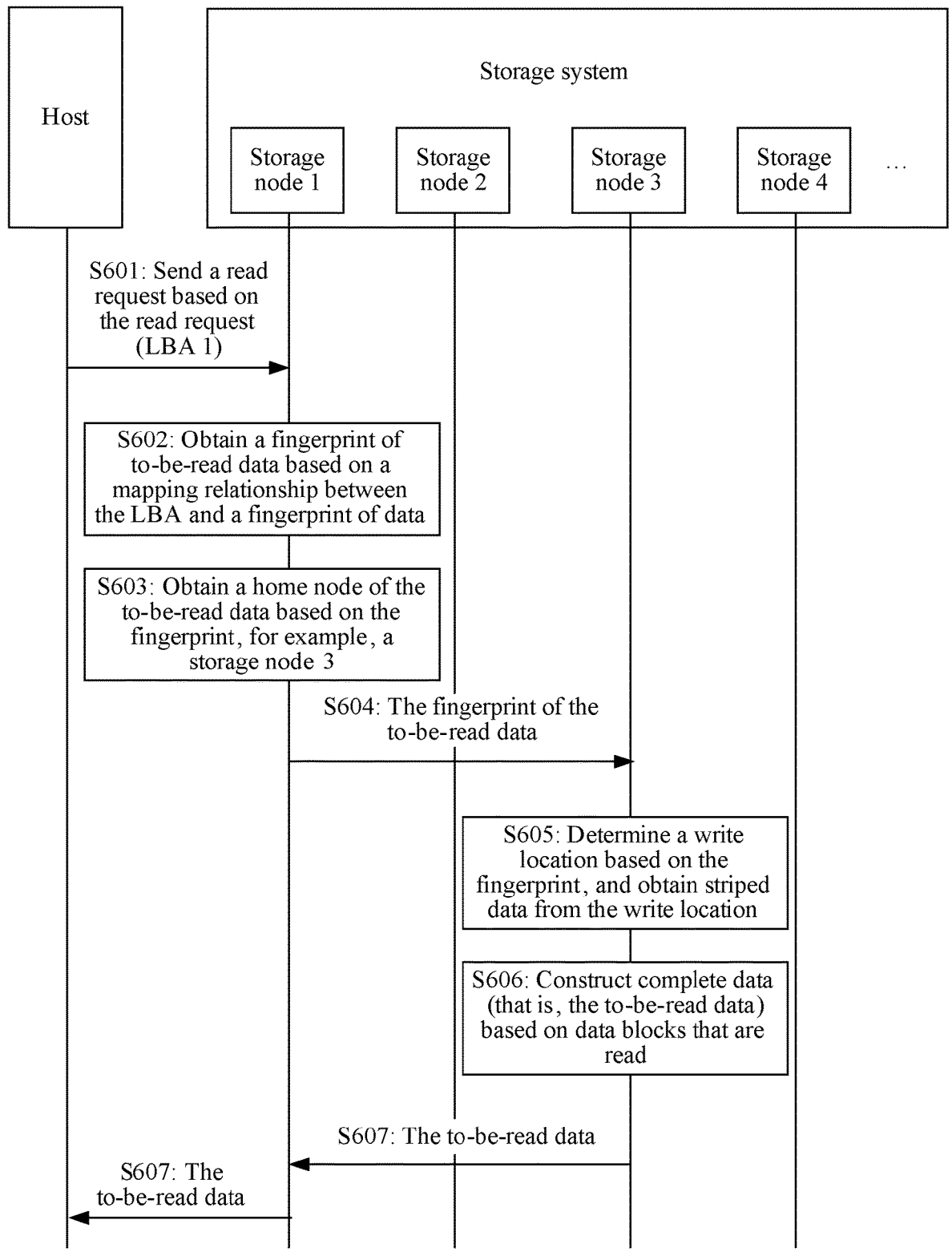
FIG. 11 is a flowchart of a data read method in FIG. 10A and FIG. 10B according to an embodiment.

Referring to FIG. 11, FIG. 11 is a flowchart of a data read method applied to the storage system shown in FIG. 2 according to an embodiment. Details are as follows:

S601: A host sends a read request to a storage system, where the read request carries an LBA 1. A storage node 1 in the storage system receives the write request. Specifically, the host sends the read request to a switch, and after receiving the read request, the switch forwards the read request to the storage node 1 based on the read request.

The data read procedure shown in FIG. 11 is described based on the data write procedure shown in FIG. 10A and FIG. 10B. For a specific implementation process of how the switch forwards the read request to the storage node 1, refer to a specific implementation process of how the switch forwards the write request to the storage node 1 in the data write procedure shown in FIG. 10A and FIG. 10B, and details are not described herein again.

S602: The storage node 1 obtains a fingerprint of to-be-read data based on a mapping relationship between an LBA and a fingerprint of data. The mapping relationship is shown in a table such as the metadata table M2 shown in Table 2. The fingerprint of the to-be-read data is the fingerprint of the to-be-written data in the foregoing description. Then, the storage node 1 may further obtain a home node of the to-be-read data based on information that is recorded in the metadata table M2 or through calculation. It can be learned based on the foregoing description that the determined home node of the to-be-read data is a storage node 3.

S603: The storage node 1 obtains a home node of the to-be-read data, for example, a storage node 3.

For S604 to S607, refer to S206 to S209. The disclosure is not limited thereto.

In this embodiment, the host determines, based on a correspondence between an LBA and a storage node, a storage node that is in the storage system and to which the read/write request is sent, that is, the storage node does not need to determine the home node of the LBA. In this way, signaling interaction between the storage nodes may be reduced, thereby improving a read/write rate. In addition, it can be learned based on beneficial effects of Embodiment 1 that, this embodiment helps implement load balancing, thereby improving system performance.

Embodiment 4

Figure 12:
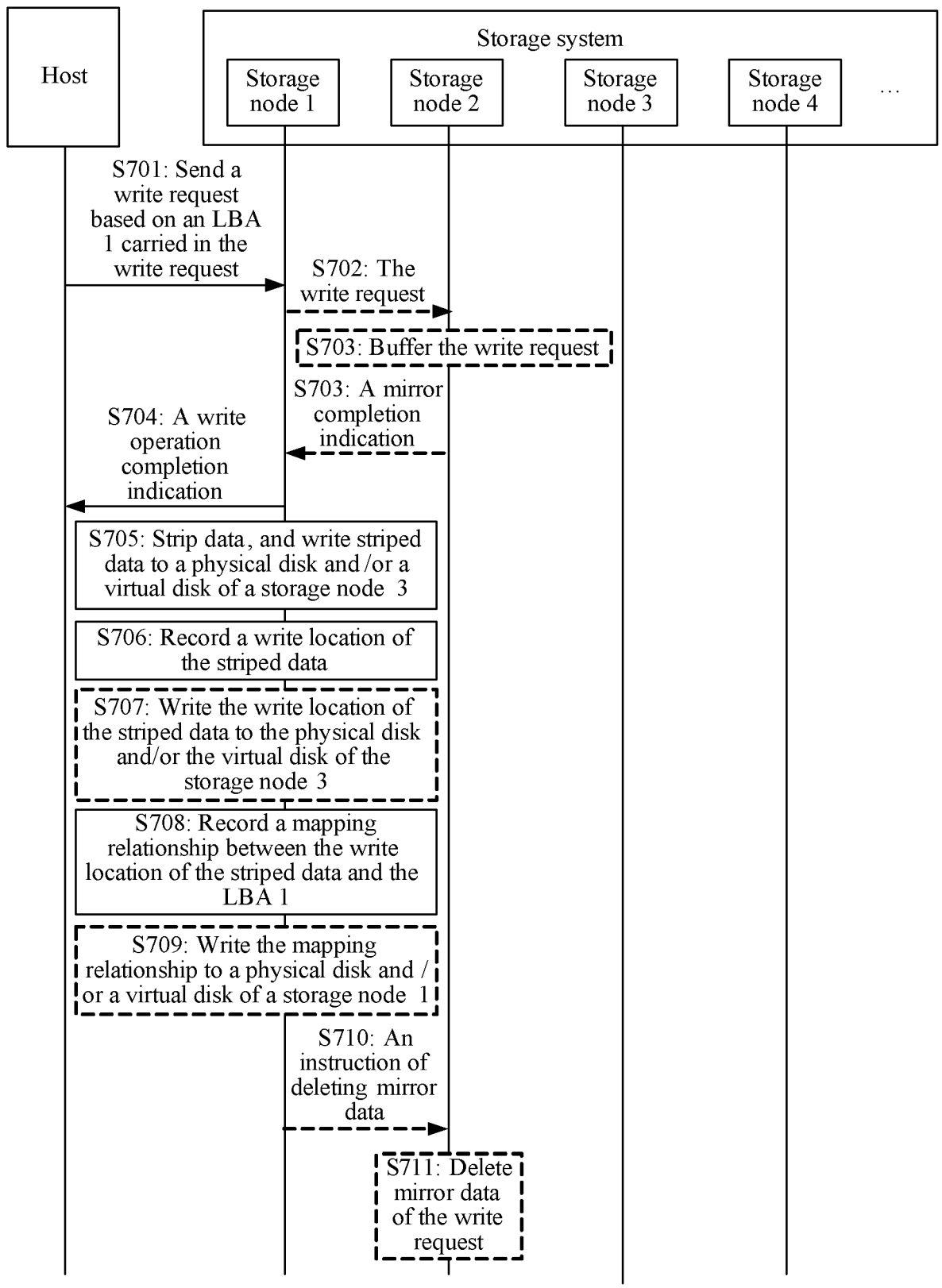
FIG. 12 is a flowchart 4 of a data write method according to an embodiment.

Referring to FIG. 12, FIG. 12 is a flowchart of a data write method applied to the storage system shown in FIG. 2 according to an embodiment. Details are as follows:

For S701 to S704, refer to S501 to S504. The disclosure is not limited thereto.

S705: The storage node 1 strips the to-be-written data to obtain striped data, and writes the striped data to a physical disk and/or a virtual disk of the storage node 1.

S706: The storage node 1 records a write location of the striped data. Specifically, the storage node 1 may record the write location of the striped data by recording distribution information of the to-be-written data.

S707: The storage node 1 writes the write location of the striped data to the physical disk and/or the virtual disk of the storage node 1.

For related descriptions of S705 to S707, refer to S307 to S309, and details are not described herein again.

S708: The storage node 1 records a mapping relationship between the write location of the striped data and the LBA 1.

S709: The storage node 1 writes the mapping relationship between the write location of the striped data and the LBA 1 to the physical disk and/or the virtual disk of the storage node 1.

For S710 and S711, refer to S117 and S118. The disclosure is not limited thereto.

Figure 13:
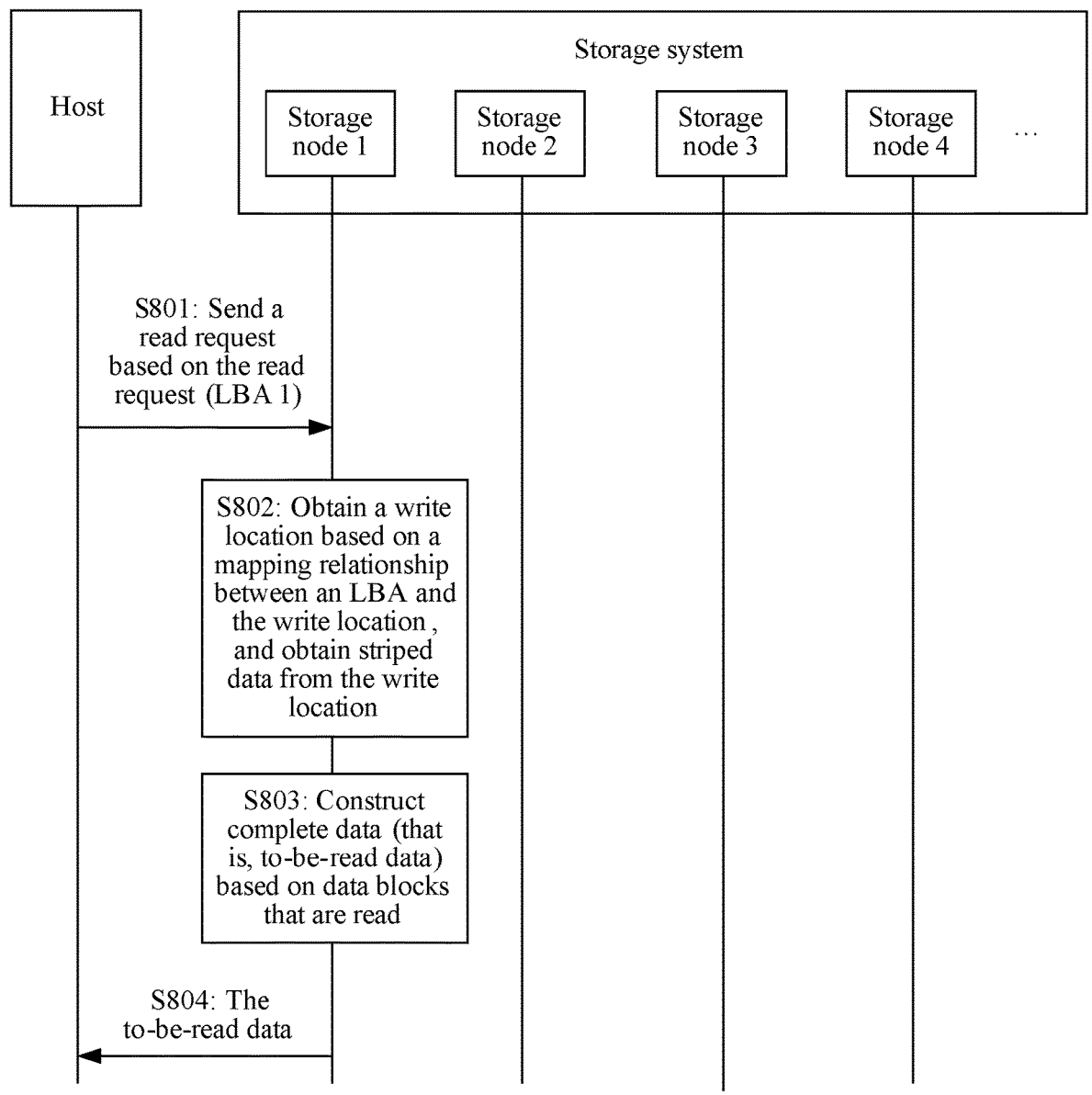
FIG. 13 is a flowchart of a data read method in FIG. 12 according to an embodiment.

Referring to FIG. 13, FIG. 13 is a flowchart of a data read method applied to the storage system shown in FIG. 2 according to an embodiment. Details are as follows:

For S801, refer to S601. Certainly, the disclosure is not limited thereto.

S802: The storage node 1 determines a write location of striped data of the to-be-read data based on the LBA, and obtains the write location of the striped data of the to-be-read data based on a table such as a metadata table obtained by deleting a fingerprint of data from Table 1. Then, some or all of the striped data is obtained from the write location.

S803: The storage node 1 constructs complete data based on data blocks that are read, that is, data before the striping is performed.

For related descriptions of S802 and S803, refer to S404 and S405, and details are not described herein again.

S804: The storage node 1 feeds back the to-be-read data to the host.

In this embodiment, the host determines, based on a correspondence between an LBA and a storage node, a storage node that is in the storage system and to which the read/write request is sent. That is, the storage node does not need to determine the home node of the LBA. In this way, signaling interaction between the storage nodes may be reduced, thereby improving a read/write rate. In addition, it can be learned based on beneficial effects of Embodiment 2 that, this embodiment helps implement load balancing, thereby improving system performance.

The foregoing mainly describes the solutions of the embodiments from the perspective of interaction between nodes. It may be understood that, to implement the foregoing functions, each node such as a host or a storage node includes a corresponding hardware structure and/or a software module that executes each function. A person skilled in the art should be easily aware that, in combination with the units and algorithm steps of the examples described in the embodiments disclosed in this specification, disclosed embodiments can be implemented by hardware or a combination of hardware and computer software. Whether a function is executed in a mode of hardware or computer software driving hardware depends on particular applications and design constraint conditions of the technical solutions. A person skilled in the art may use different methods to implement the described functions for each particular application, but it should not be considered that the implementation goes beyond the scope of this disclosure.

In the embodiments, function module division may be performed on the storage node based on the foregoing method example, for example, each function module may be divided corresponding to each function, or two or more functions may be integrated into one processing module. The integrated module may be implemented in a form of hardware, or may be implemented in a form of a software function module. It should be noted that, the module division in the embodiments is an example and is merely logical function division, and may be other division during actual implementation. The following description is made by using an example in which function modules are divided correspondingly to functions.

Figure 14:
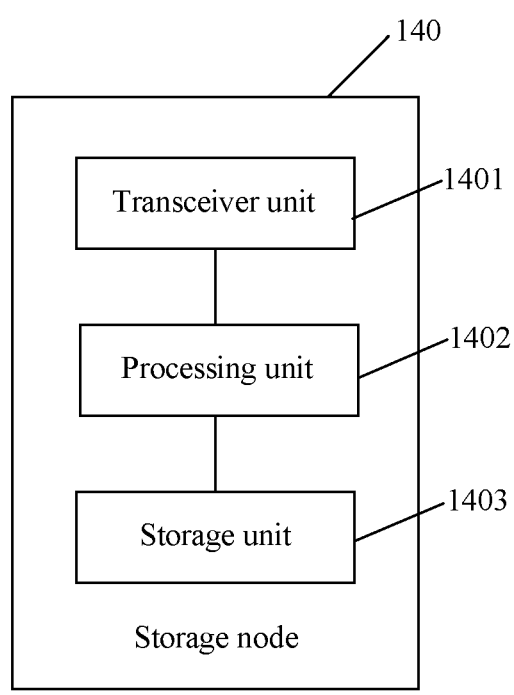
FIG. 14 is a schematic structural diagram of a storage node according to an embodiment.

FIG. 14 is a schematic structural diagram of a storage node 140. The storage node 140 may be any storage node used above. The storage node 140 communicates with at least one second storage node in a storage system by using a switch and a host, and a physical disk included in the at least one second storage node is mapped to a virtual disk of the storage node 140. The storage node 140 includes: a transceiver unit 1401, a processing unit 1402, and a storage unit 1403. The transceiver unit 1401 is configured to receive a first write request, where the first write request carries first to-be-written data. The processing unit 1402 is configured to strip the first to-be-written data to obtain striped data, and write the striped data to a physical disk and/or the virtual disk of the storage node 140. The storage unit 1403 is configured to record a write location of the striped data. For example, with reference to FIG. 6A and FIG. 6B or FIG. 10A and FIG. 10B, the storage node 140 may be a storage node 3, the transceiver unit 1401 may be configured to perform S106/S506, the processing unit 1402 may be configured to perform S108/S508, and the storage unit 1403 may be configured to perform S109/S509. For example, with reference to FIG. 8A and FIG. 8B, the storage node 140 may be a storage node 4, the transceiver unit 1401 may be configured to perform S306, the processing unit 1402 may be configured to perform S307, and the storage unit 1403 may be configured to perform S308. For example, with reference to FIG. 12, the storage node 140 may be a storage node 1, the transceiver unit 1401 may be configured to perform S701, the processing unit 1402 may be configured to perform S705, and the storage unit 1403 may be configured to perform S706.

In a possible design, the processing unit 1402 may be specifically configured to: when the striped data is written to the virtual disk, write the striped data to the physical disk that is in the second storage node and that is mapped to the virtual disk.

In a possible design, the storage unit 1403 may be further configured to: when recording the write location of the striped data, further record a fingerprint of the first to-be-written data. For example, refer to Table 1 in Embodiment 1.

In a possible design, the storage unit 1403 may be further configured to: when recording the write location of the striped data, further record an LBA of the first to-be-written data. For example, with reference to FIG. 8A and FIG. 8B or FIG. 12, the storage unit 1403 may be configured to perform S310/S708.

In a possible design, the transceiver unit 1401 may be further configured to receive a second write request sent by the host, where the second write request carries second to-be-written data. The processing unit 1402 is further configured to: determine a home node of the second write request based on the second write request, and if the home node of the second write request is the storage node 140, the storage node 140 performs a write operation in response to the second write request, or if the home node of the second write request is the second storage node, the storage node 140 forwards the second write request to the second storage node, so that the second storage node performs a write operation in response to the second write request. For example, with reference to FIG. 6A and FIG. 6B, FIG. 8A and FIG. 8B, or FIG. 10A and FIG. 10B, the storage node 140 may be a storage node 1. The transceiver unit 1401 may be configured to perform S101/S301/S501. The processing unit 1402 may be configured to perform S105/S305/S505.

In a possible design, the processing unit 1402 may be specifically configured to: calculate a fingerprint of the second to-be-written data; and then, determine the home node of the second write request based on the fingerprint of the second to-be-written data. For example, with reference to FIG. 6A and FIG. 6B or FIG. 10A and FIG. 10B, the processing unit 1402 may be configured to perform S105/S505. In a possible design, the processing unit 1402 may be further configured to determine a home node of an LBA carried in the second write request, where the home node of the LBA is configured to manage a mapping relationship between the LBA and the fingerprint of the second to-be-written data. For example, with reference to FIG. 6A and FIG. 6B, the processing unit 1402 may be configured to perform S112.

In a possible design, the processing unit 1402 may be specifically configured to determine the home node of the second write request based on the LBA carried in the second write request. For example, with reference to FIG. 8A and FIG. 8B, the processing unit 1402 may be configured to perform S305.

In a possible design, the transceiver unit 1401 may be further configured to receive a fingerprint of first to-be-read data requested by a first read request. The processing unit 1402 may be further configured to: obtain a write location of the first to-be-read data based on the fingerprint of the first to-be-read data, and read striped data of the first to-be-read data from the write location of the first to-be-read data. For example, with reference to FIG. 7 or FIG. 11, the storage node 140 may be a storage node 3. The transceiver unit 1401 may be configured to perform S206/S604, and the processing unit 1402 may be configured to perform S207/S605.

In a possible design, the transceiver unit 1401 may be further configured to receive a first read request, where the first read request carries a first LBA. The processing unit 1402 may be further configured to: obtain, based on the first LBA, a write location of first to-be-read data requested by the first read request, and read striped data of the first to-be-read data from the write location of the first to-be-read data. For example, with reference to FIG. 9, the storage node 140 may be a storage node 4, the transceiver unit 1401 may be configured to perform S403, and the processing unit 1402 may be configured to perform S404. For example, with reference to FIG. 13, the storage node 140 may be a storage node 1, the transceiver unit 1401 may be configured to perform S801, and the processing unit 1402 may be configured to perform S803.

In a possible design, the transceiver unit 1401 may be further configured to receive a second read request sent by the host. The processing unit 1402 may be further configured to: determine a home node of the second read request based on the second read request, and if the home node of the second read request is the storage node 140, the storage node 140 performs a read operation in response to the second read request, or if the home node of the second read request is the second storage node, the storage node 140 forwards the second read request to the second storage node, so that the second storage node performs a read operation in response to the second read request. For example, with reference to FIG. 7, FIG. 9, or FIG. 11, the storage node 140 may be a storage node 1. The transceiver unit 1401 may be configured to perform S201/S401/S601, and the processing unit 1402 may be configured to perform S205/S402/S603.

In a possible design, the processing unit 1402 may be specifically configured to: determine a home node of an LBA carried in the second read request, where the home node of the LBA is configured to manage a mapping relationship between the LBA and a fingerprint of second to-be-read data requested by the second read request; obtain the fingerprint of the second to-be-read data from the home node of the second LBA; and determine the home node of the second read request based on the fingerprint of the second to-be-read data. For example, with reference to FIG. 7 or FIG. 11, the transceiver unit 1401 may be configured to perform S201/S601, and the processing unit 1402 may be configured to perform S205/S603.

In a possible design, the processing unit 1402 may be specifically configured to determine the home node of the second read request based on the LBA carried in the second read request. For example, with reference to FIG. 9, the transceiver unit 1401 may be configured to perform S401, and the processing unit 1402 may be configured to perform S402.

It should be noted that, in some of the foregoing implementations, the storage node 140 may be specifically different storage nodes in a same accompanying drawing. For example, with reference to FIG. 6A and FIG. 6B, in a scenario in which a storage system receives a first write request, the storage node 140 may be specifically a storage node 3; and in a scenario in which a storage system receives a first read request, the storage node 140 may be specifically a storage node 1. However, because each storage node in a storage system has arbitrariness, during specific implementation, in a scenario in which different data is read/written a plurality of times, a same storage node 140 may have a function that is provided in any of the foregoing technical solutions.

In addition, it should be noted that, relationships between the units in the storage node 140 and some steps of the foregoing method embodiments are described above by way of example. Actually, the units in the storage node 140 may further perform other related steps in the foregoing method embodiments, and details are not listed herein one by one.

For a hardware implementation of the storage node 140, refer to the storage node shown in FIG. 2. With reference to FIG. 2, the transceiver unit 1401 may correspond to the internal port 220 in FIG. 2. The processing unit 1402 may correspond to the CPU and/or the storage controller in FIG. 2. The storage unit 1403 may correspond to the memory in FIG. 2. Optionally, the storage unit 1403 may correspond to the memory chip in FIG. 2.

Because the storage node provided in this embodiment may be configured to perform the read/write procedure provided above, for technical effects that can be achieved by the storage node, refer to the foregoing method embodiments, and details are not described in this embodiment again.

The foregoing embodiments may be entirely or partially implemented by using software, hardware, firmware, or any combination thereof. When the embodiments are implemented by using a software program, the embodiments may be entirely or partially implemented in a form of a computer program product. The computer program product includes one or more computer instructions. When the computer instructions are loaded and executed on a computer, the procedures or functions according to the embodiments are all or partially generated. The computer may be a general-purpose computer, a dedicated computer, a computer network, or another programmable apparatus. The computer instructions may be stored in a computer-readable storage medium, or is transmitted from one computer-readable storage medium to another computer-readable storage medium. For example, the computer instructions may be transmitted from one website, computer, server or data center to another website, computer, server or data center in a wired (for example, a coaxial cable, an optical fiber, or a digital subscriber line (DSL)) or wireless (for example, infrared, radio, or microwave) manner. The computer-readable storage medium may be any available medium that a computer can access or a data storage device such as a server or a data center that includes one or more integrated available media. The available medium may be a magnetic medium (for example, a floppy disk, a hard disk, or a magnetic tape), an optical medium (for example, a digital versatile disk (DVD)), a semiconductor medium (for example, an SSD), or the like.

Although this disclosure is described with reference to the embodiments, in a process of implementing this disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. The fact that certain measures are recited in mutually different dependent claims does not indicate that a combination of these measures cannot bring better effects.

Although this disclosure is described with reference to the specific features and the embodiments of this disclosure, various modifications and combinations can be made without departing from the spirit and scope of this disclosure. Correspondingly, this disclosure and the accompanying drawings are merely examples of descriptions of defined by the appended claims, and it is considered that any and all modifications, changes, combinations, or equivalents in the scope of this disclosure are already covered. A person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A method implemented by a storage system and comprising:
   receiving a first write request comprising first data;
   striping the first data to obtain striped data, wherein the striped data comprise first striped data; and
   writing the first striped data to a virtual storage drive in a first storage node in the storage system,
   wherein the virtual storage drive maps to a first physical storage drive for providing storage space, and
   wherein the first physical storage drive is in a second storage node in the storage system.

2. The method of claim 1, further comprising recording, in response to writing the first striped data, a first write location of the first striped data.

3. The method of claim 1, further comprising recording a fingerprint of the first data.

4. The method of claim 1, further comprising recording a first logical block address (LBA) of the first data.

5. The method of claim 4, wherein the first LBA is of the first storage node.

6. The method of claim 1, further comprising:
   receiving a first read request related to the first striped data; and
   obtaining, in response to the first read request, the first striped data from the second storage node.

7. The method of claim 6, wherein the first read request comprises a first logical block address (LBA) related to the virtual storage drive, and wherein the first LBA is of the first storage node.

8. The method of claim 1, further comprising writing second striped data to a second physical storage drive in the first storage node, wherein the first striped data and the second striped data belong to a same stripe.

9. The method of claim 8, further comprising:
   receiving a second read request related to both the first striped data and the second striped data;
   obtaining, in response to the second read request, the first striped data from the second storage node; and
   obtaining, in response to the second read request, the second striped data from the second physical storage drive.

10. The method of claim 9, wherein the second read request comprises a first logical block address (LBA) related to the virtual storage drive and a second LBA related to the second physical storage drive, and wherein both the first LBA and the second LBA are of the first storage node.

11. A first storage node in a storage system and comprising:
    a memory configured to store instructions; and
    a processor coupled to the memory and configured to execute the instructions to cause the first storage node to:
      receive a first write request comprising first data;
      stripe the first data to obtain striped data, wherein the striped data comprise a first striped data; and
      write the first striped data to a virtual storage drive in a first storage node in the storage system,
      wherein the virtual storage drive is configured to map to a first physical storage drive for providing storage space, and
      wherein the first physical storage drive is in a second storage node in the storage system.

12. The first storage node of claim 11, wherein the processor is further configured to execute the instructions to cause the first storage node to record, in response to writing the first striped data, a first write location of the first striped data.

13. The first storage node of claim 11, wherein the processor is further configured to execute the instructions to cause the first storage node to record a fingerprint of the first data.

14. The first storage node of claim 11, wherein the processor is further configured to record a first logical block address (LBA) of the first data.

15. The first storage node of claim 14, wherein the first LBA is a LBA address of the first storage node.

16. The first storage node of claim 11, wherein the processor is further configured to execute the instructions to cause the first storage node to:
    receive a first read request; and
    obtain, in response to the first read request, the first striped data from the second storage node.

17. The first storage node of claim 16, wherein the first read request comprises a first logical block address (LBA) related to the virtual storage drive, and wherein the first LBA is of the first storage node.

18. The first storage node of claim 11, wherein the processor is further configured to execute the instructions to cause the first storage node to write second striped data to a second physical storage drive in the first storage node, and wherein the first striped data and the second striped data belong to a same stripe.

19. The first storage node of claim 18, wherein the processor is further configured to execute the instructions to cause the first storage node to:

receive a second read request;

obtain, in response to the second read request, the first striped data from the second storage node; and obtain, in response to the second read request, the second striped data from the second physical storage drive.

20. The first storage node of claim 19, wherein the second read request comprises a first LBA related to the virtual storage drive and a second LBA related to the second physical storage drive, and wherein both the first LBA and the second LBA are of the first storage node.

21. A storage system comprising:

a first storage node comprising a virtual storage drive and configured to:

receive a first write request comprising first data;

stripe the first data to obtain striped data, wherein the striped data comprise first striped data, and write the first striped data to the virtual storage drive; and a second storage node comprising a first physical storage drive that maps to the virtual storage drive for providing storage space, wherein the second storage node is configured to:

obtain the first striped data from the first storage node; and store the first striped data.

22. The storage system of claim 21, wherein the striped data further comprises second striped data, wherein the first storage node further comprises a second physical storage drive, and wherein the first storage node is further configured to write the second striped data to the second physical storage drive.

* * * * *